Figure 1:
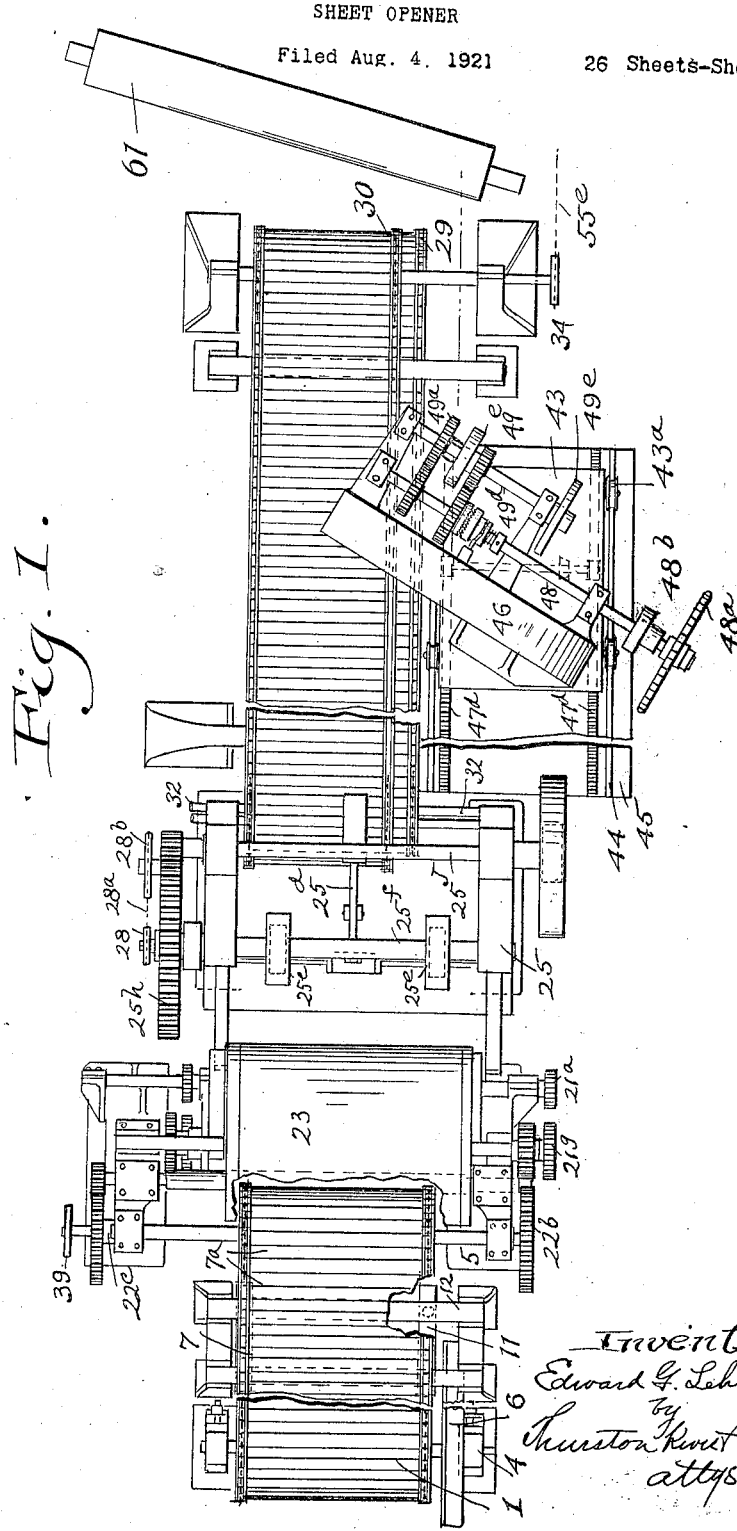

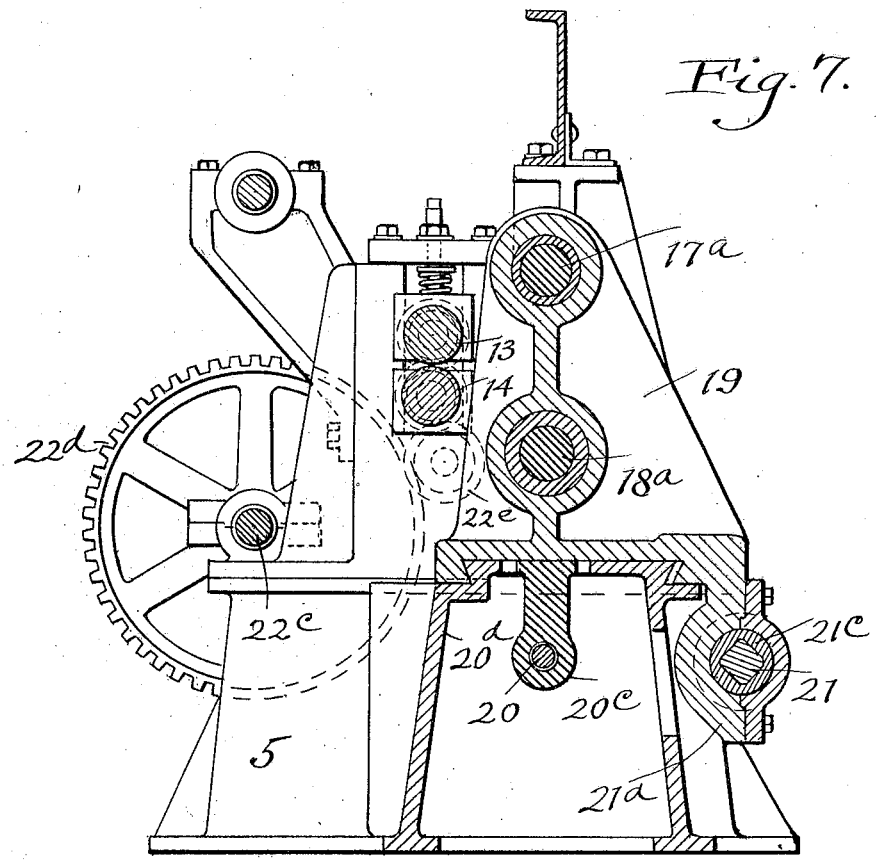
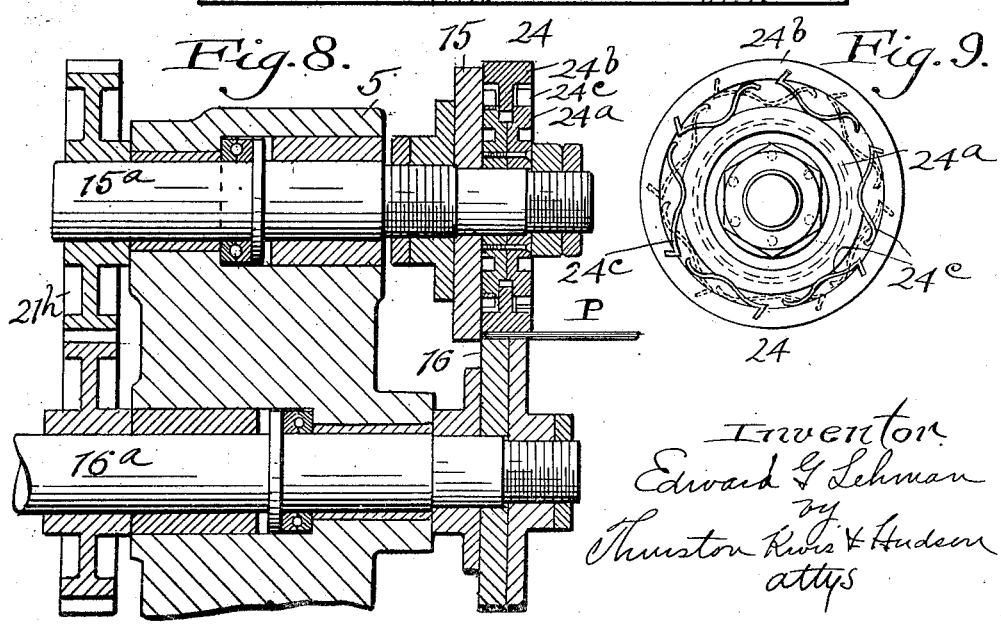

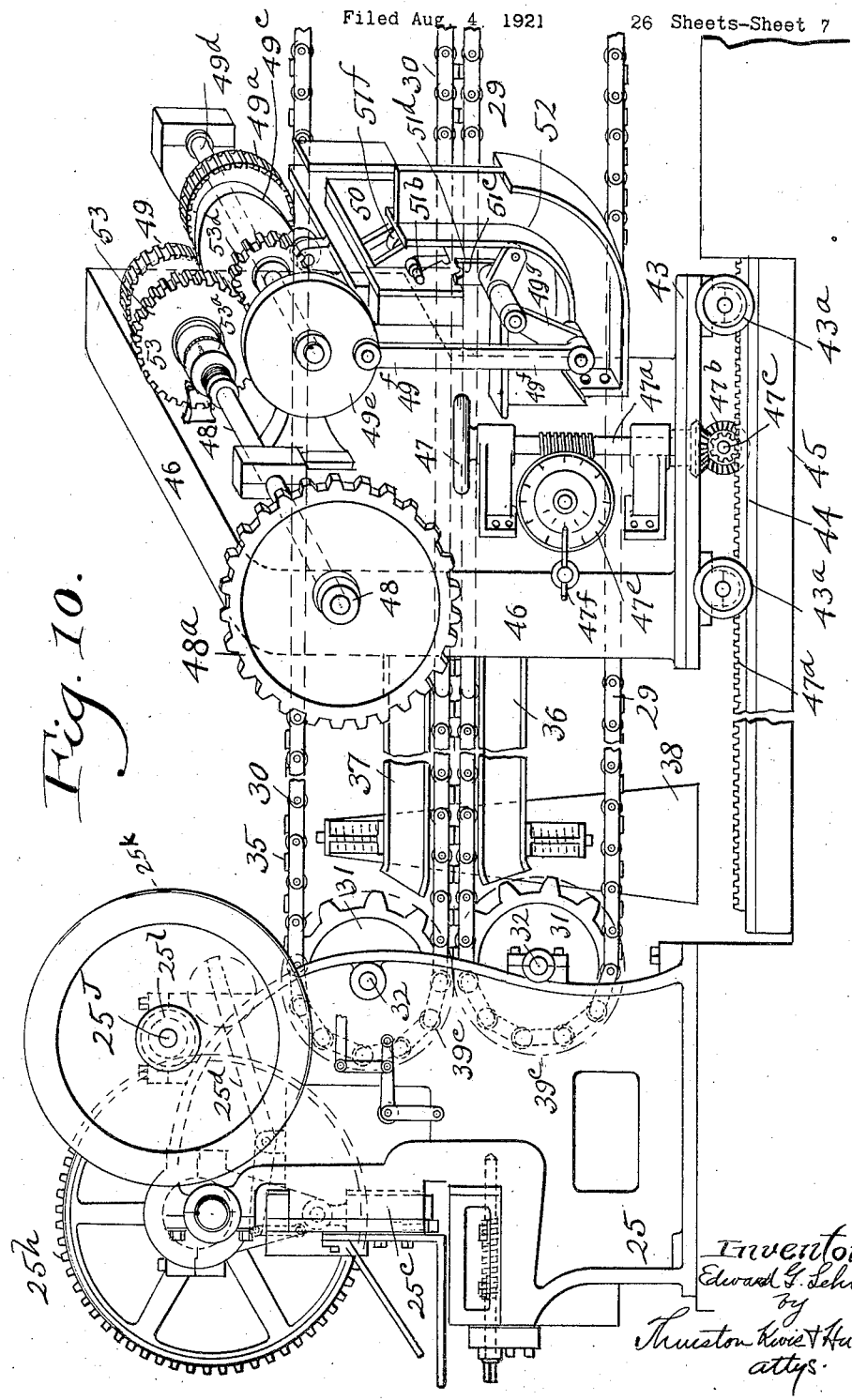

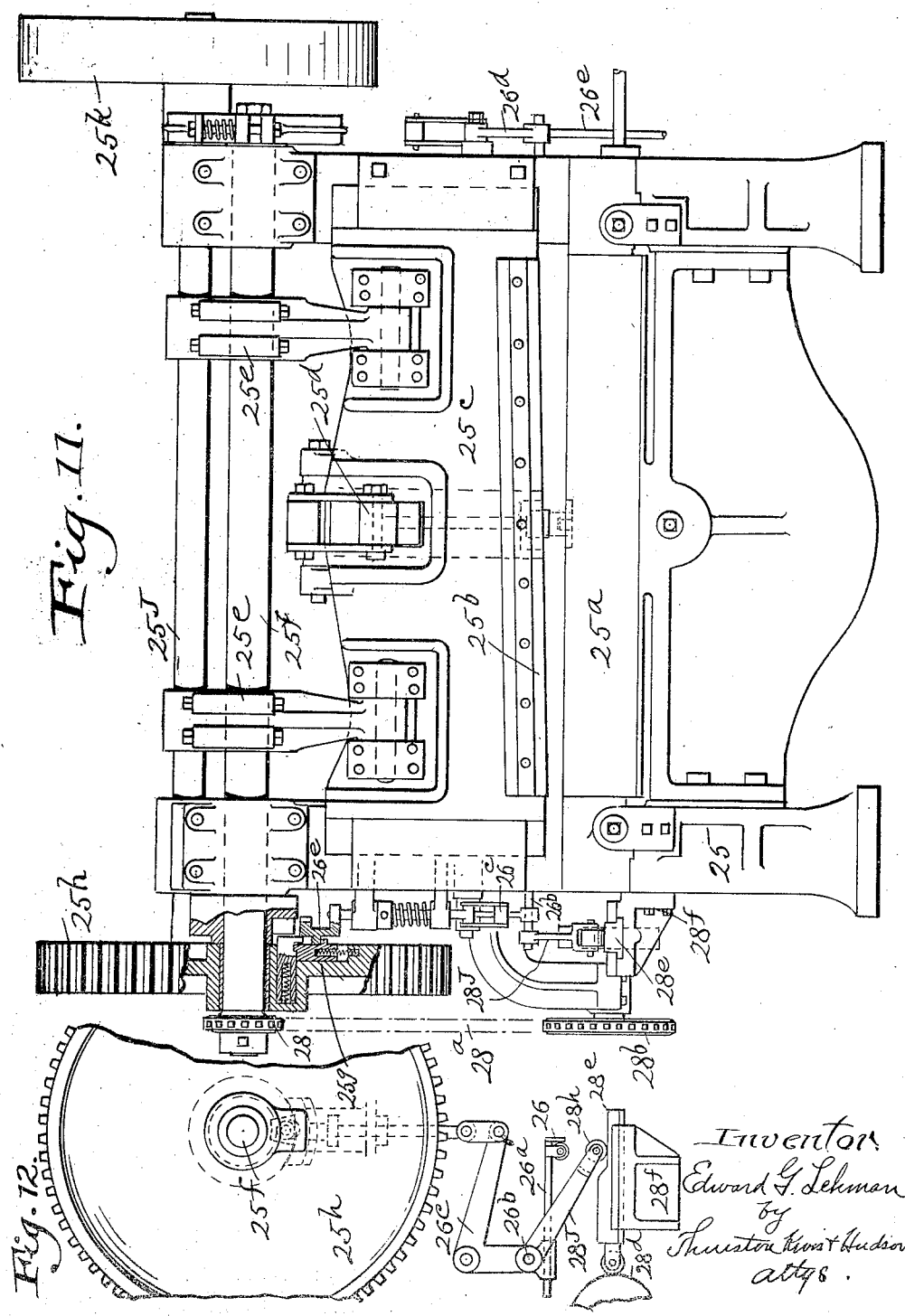

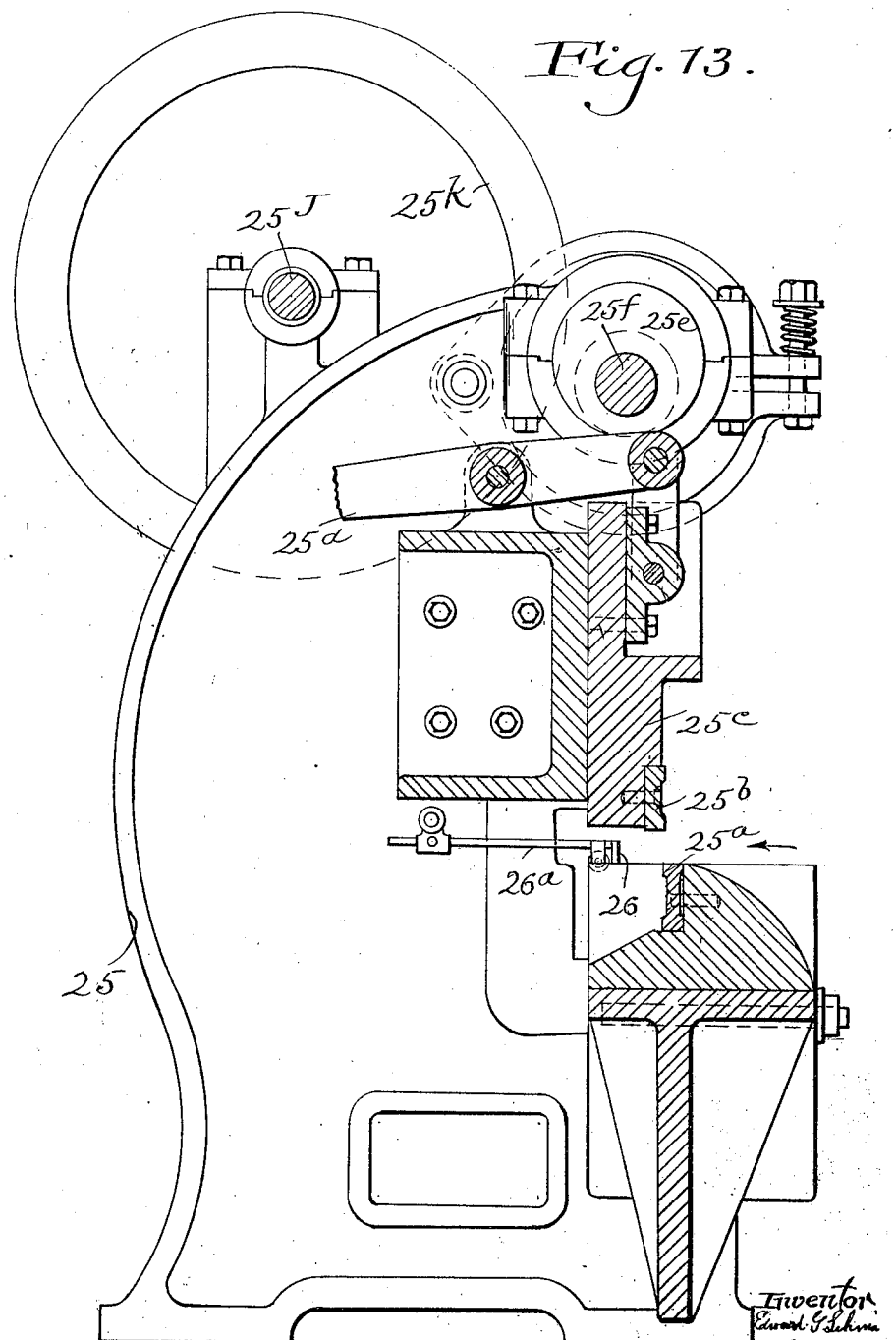

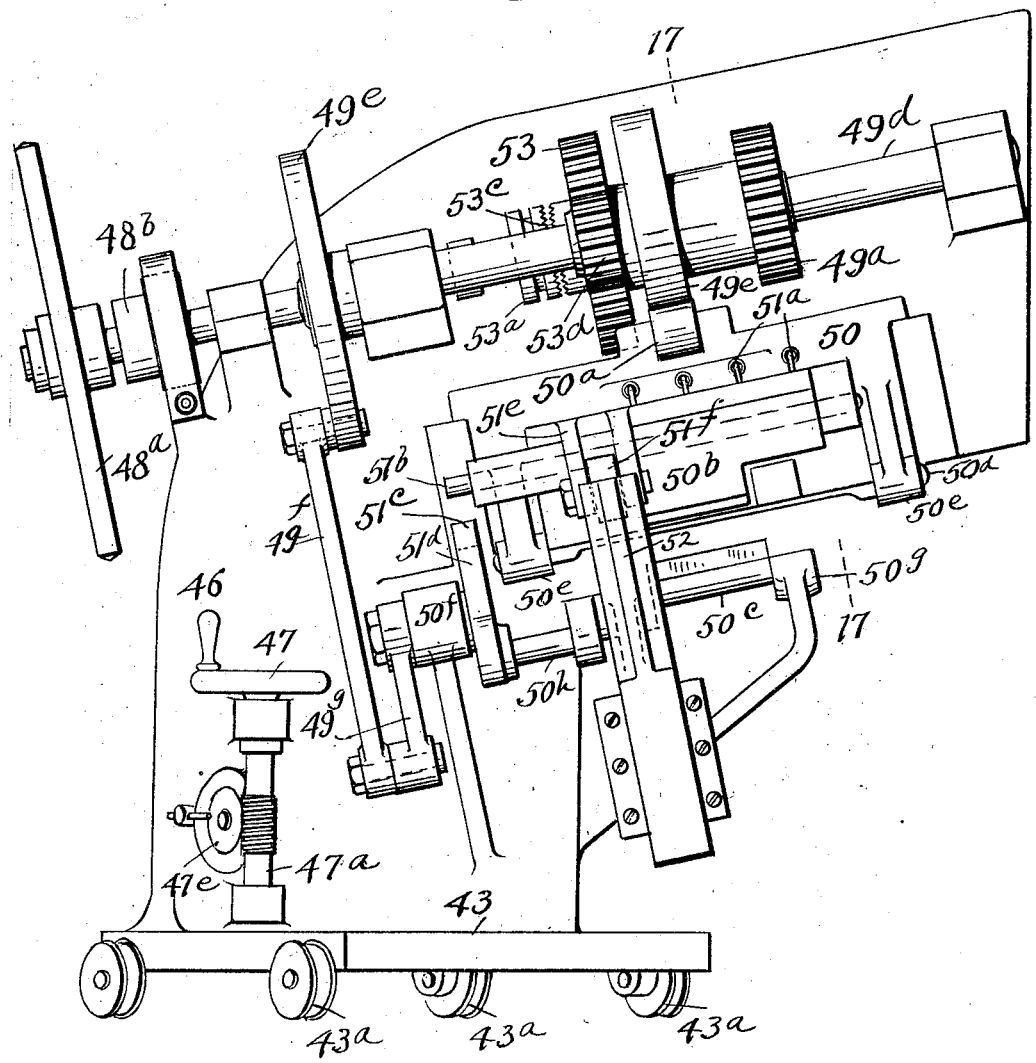

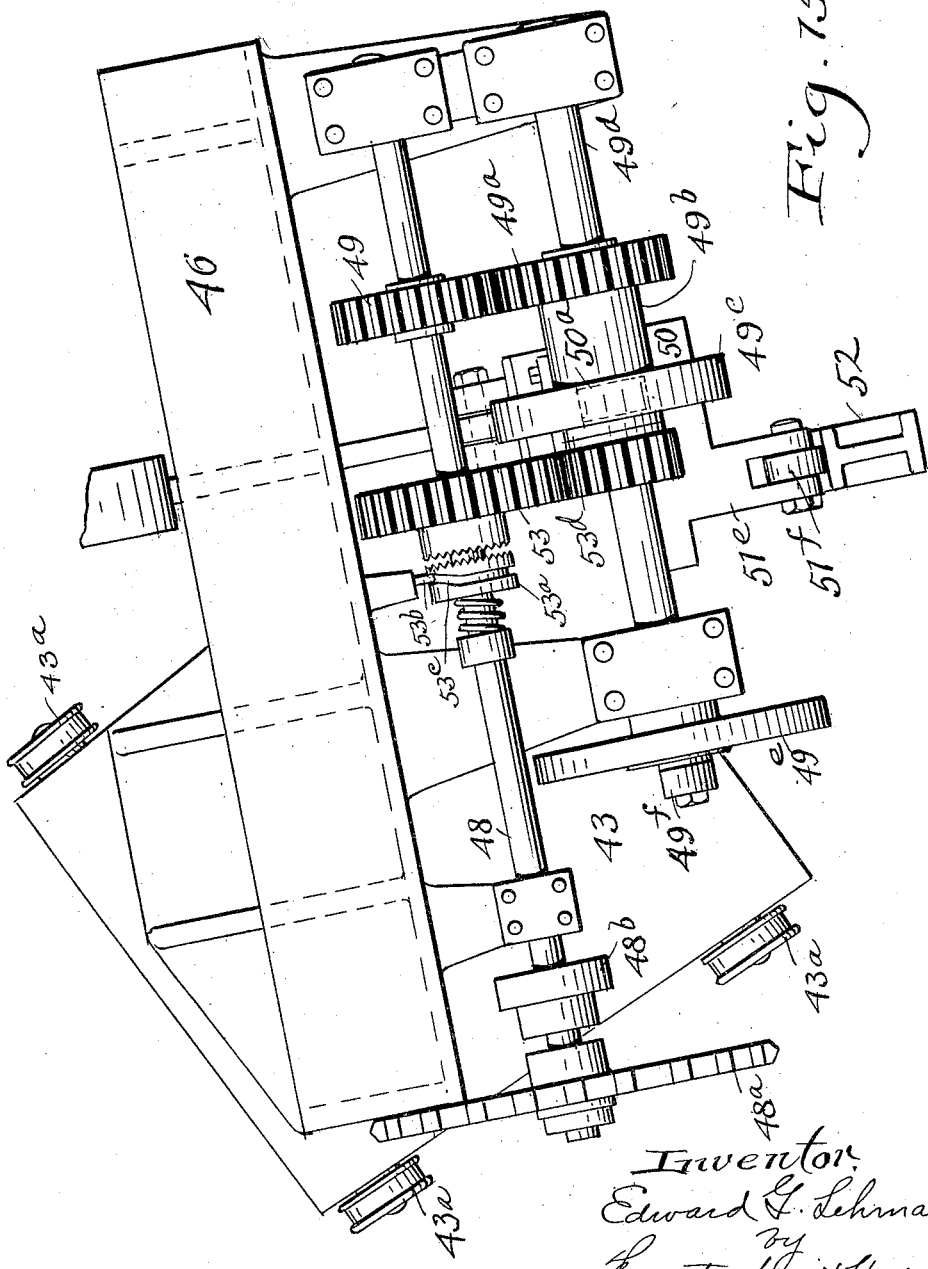

Aug. 12, 1924.

E. G. LEHMAN 1,504,487

SHEET OPENER

Filed Aug. 4, 1921   26 Sheets-Sheet 12

Inventor
Edward G. Lehman
by
Thurston Kwis & Hudson
attys

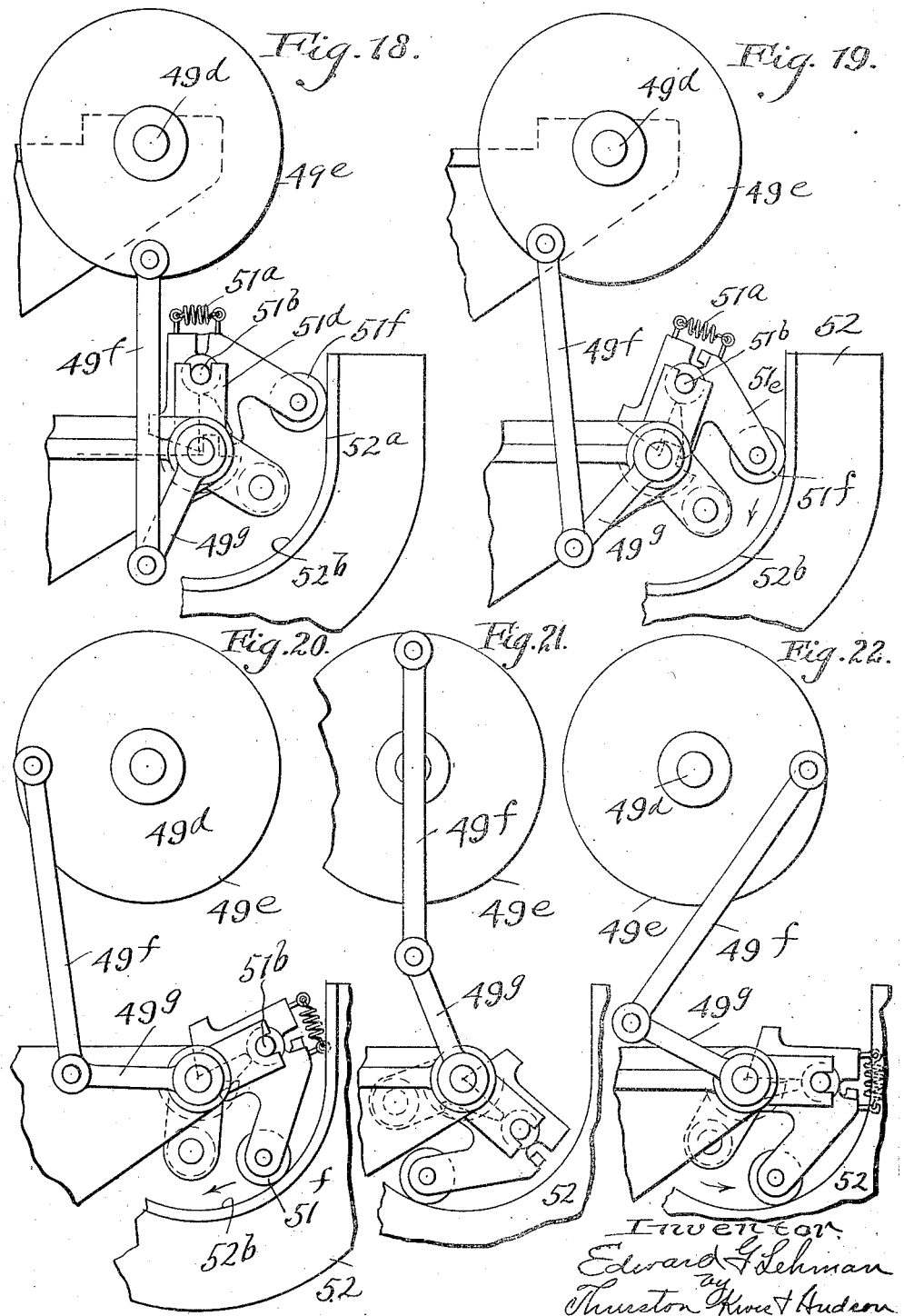

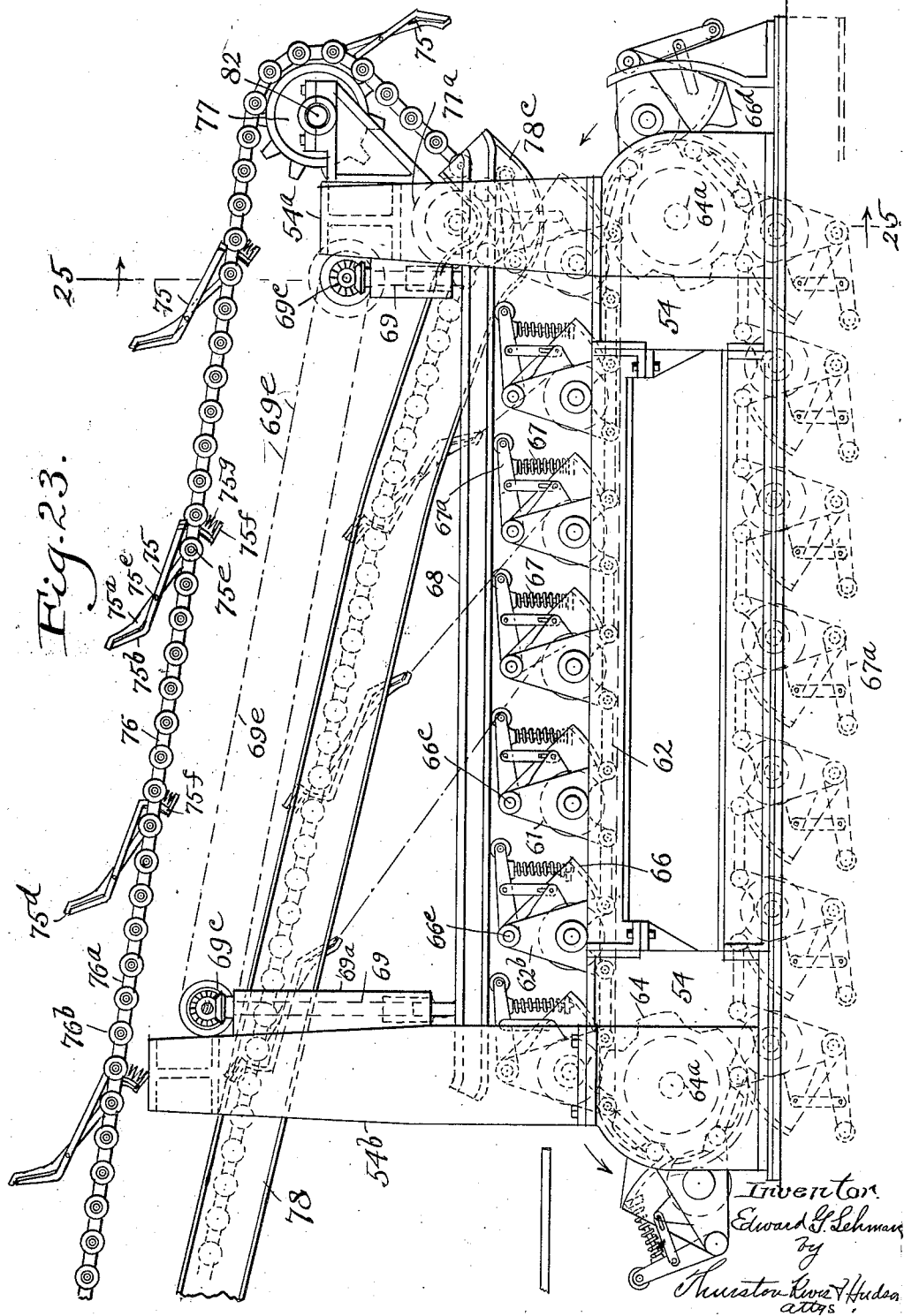

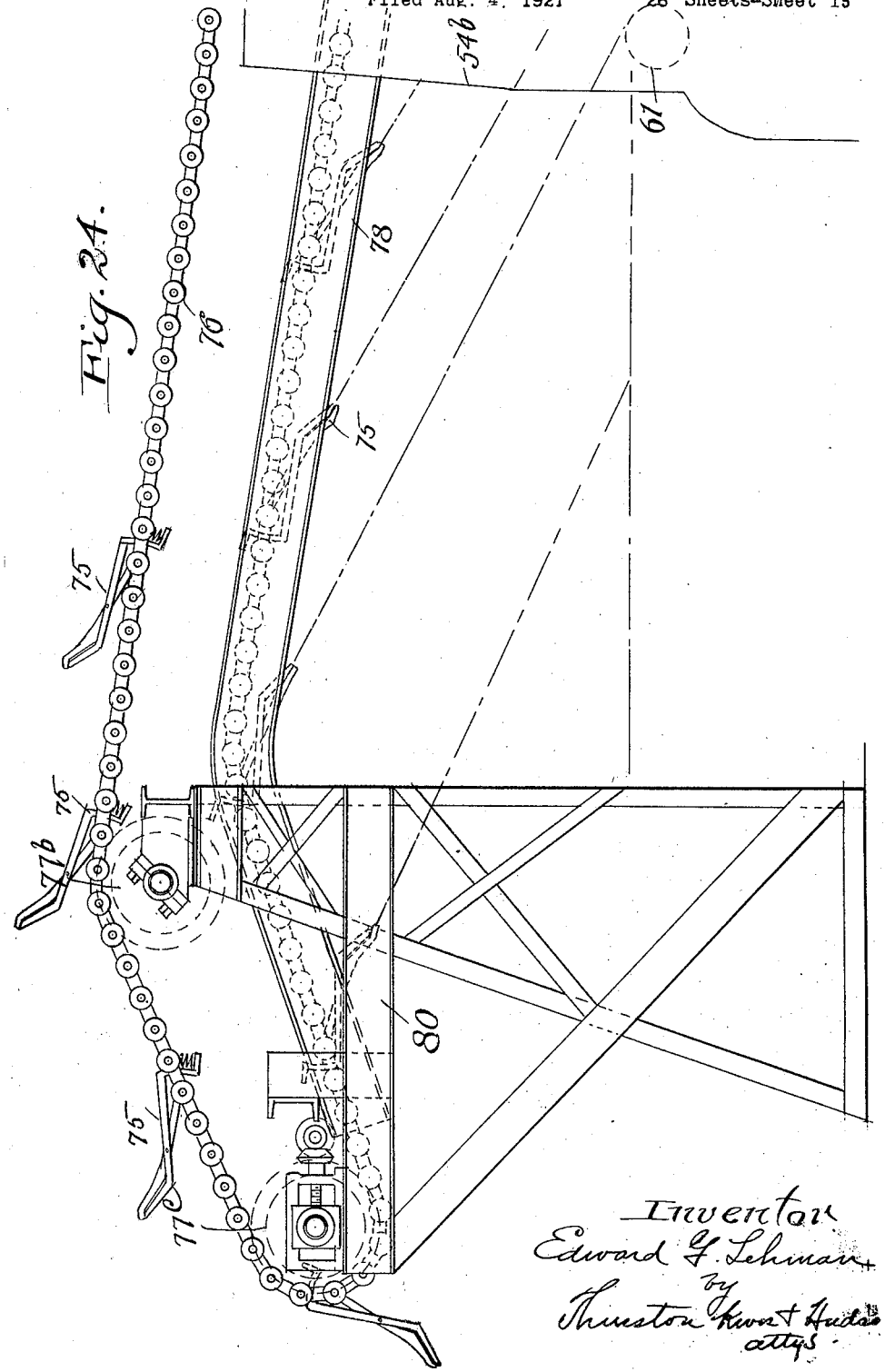

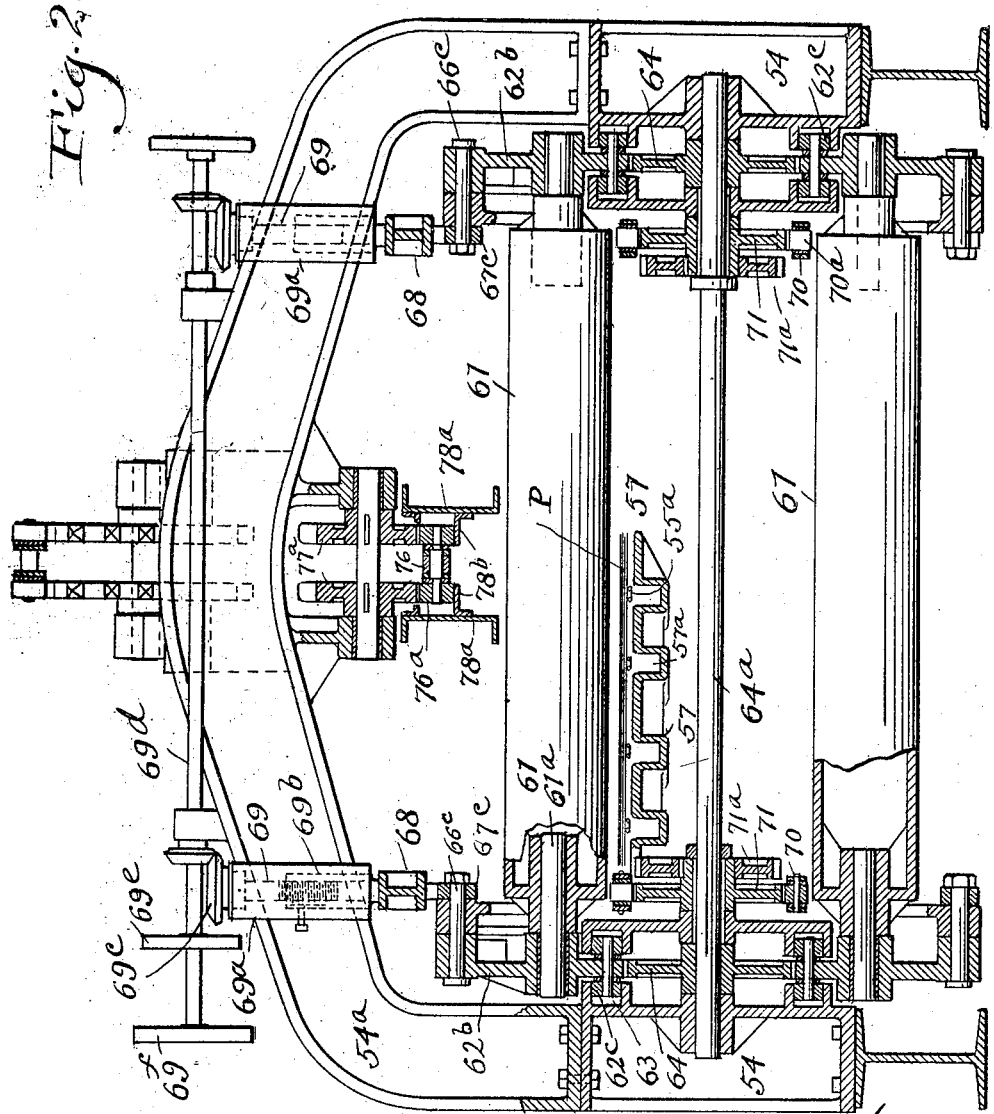

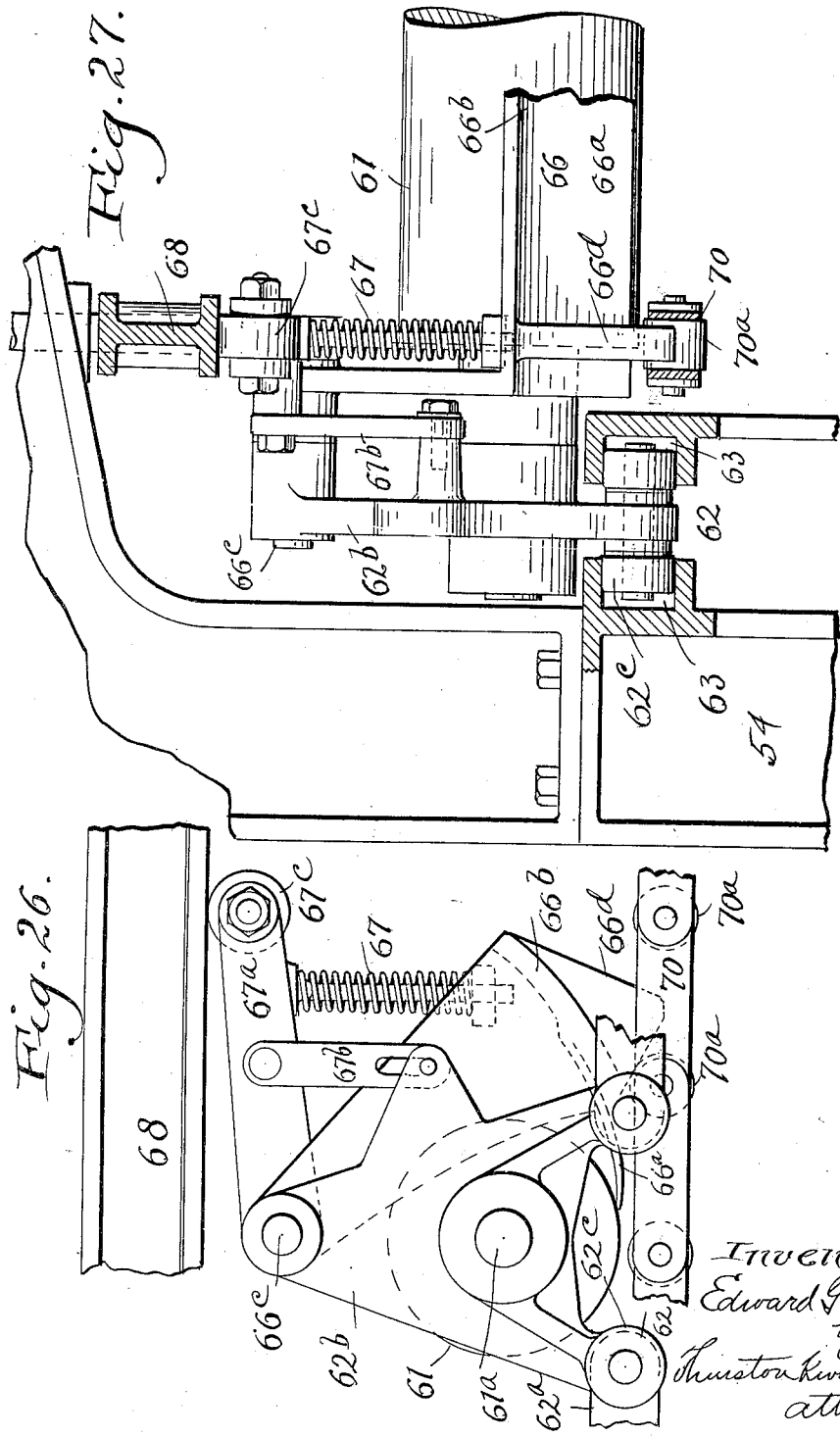

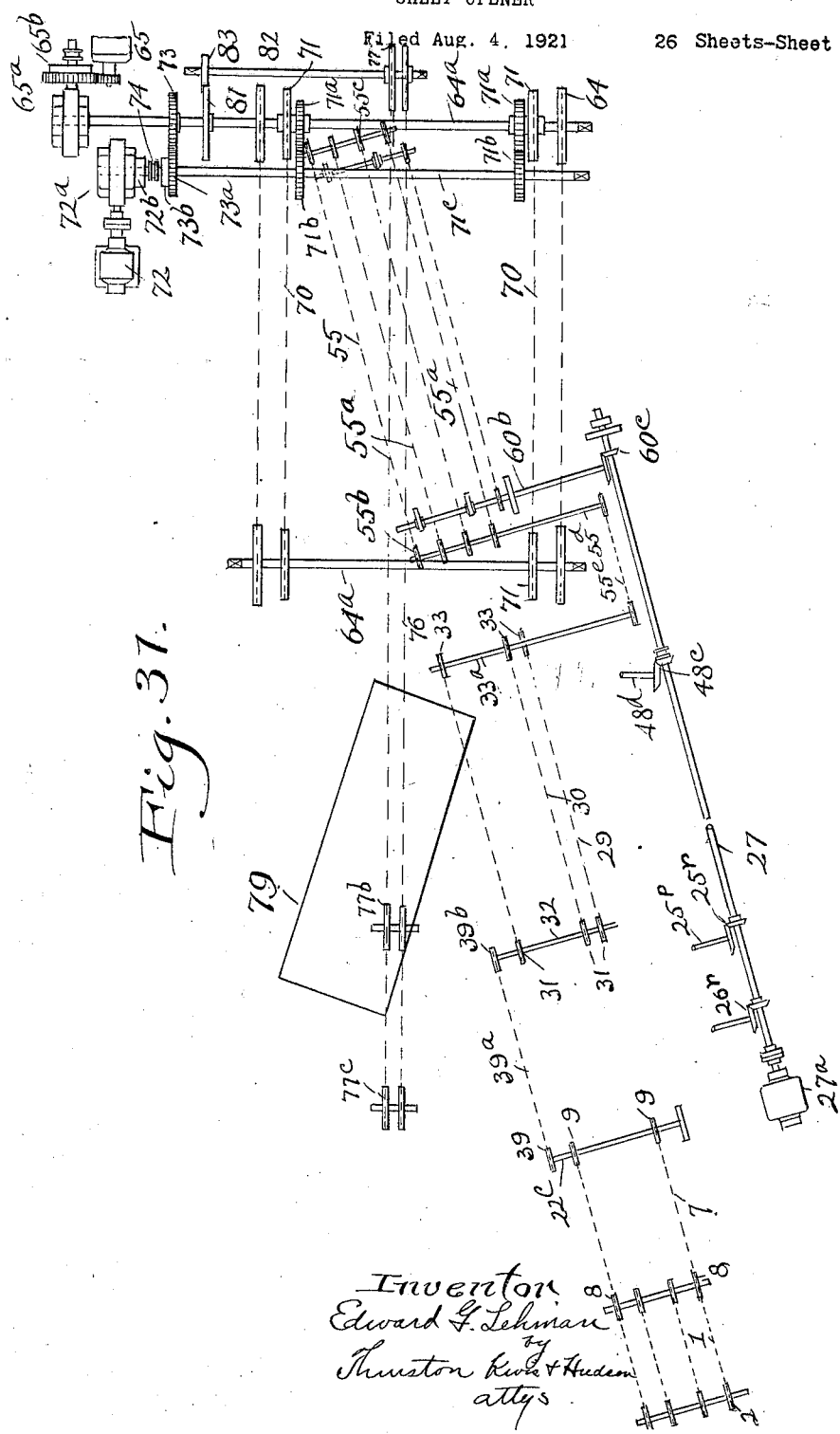

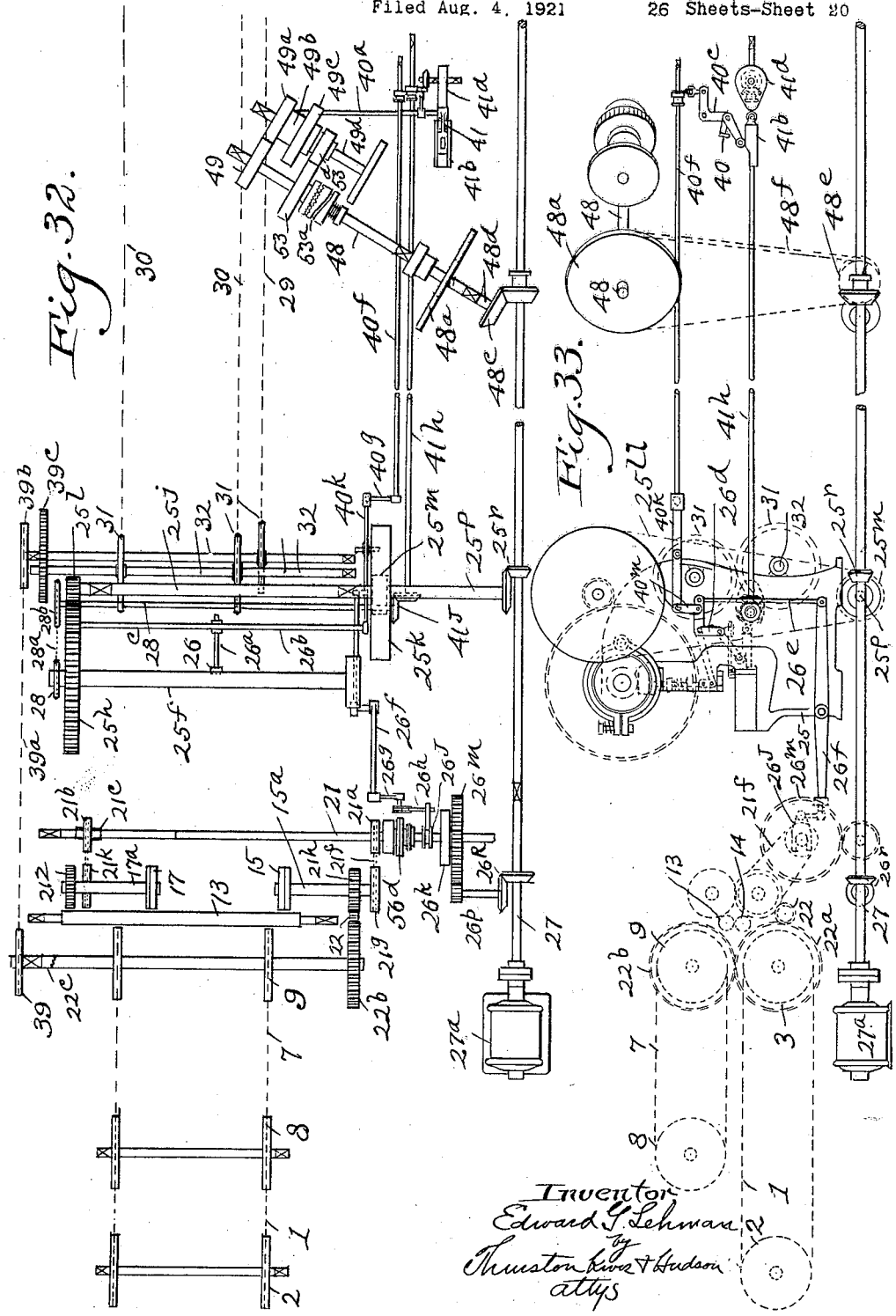

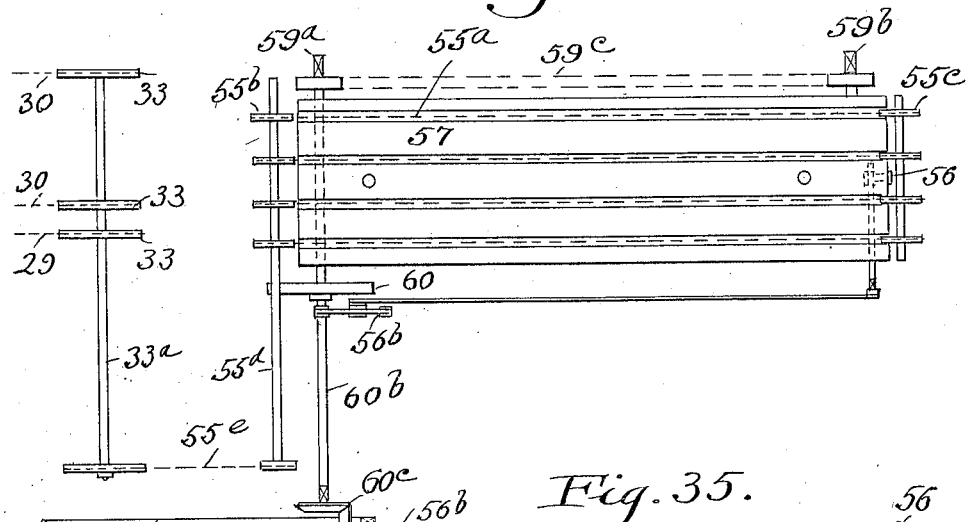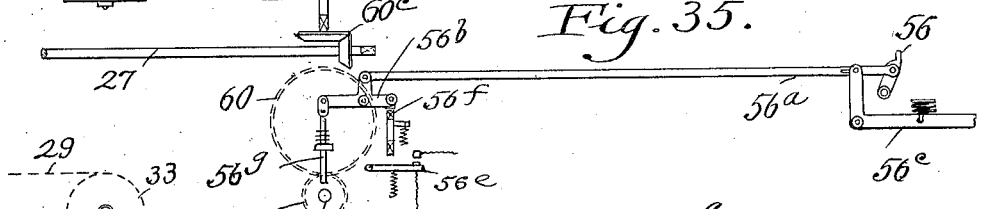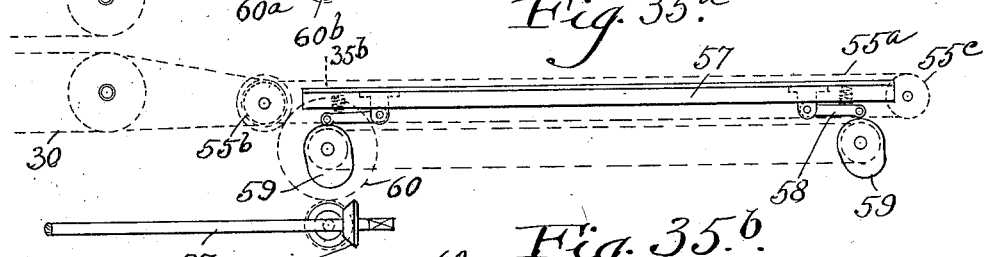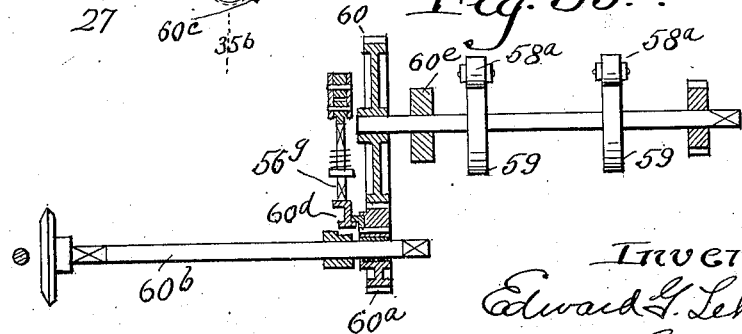

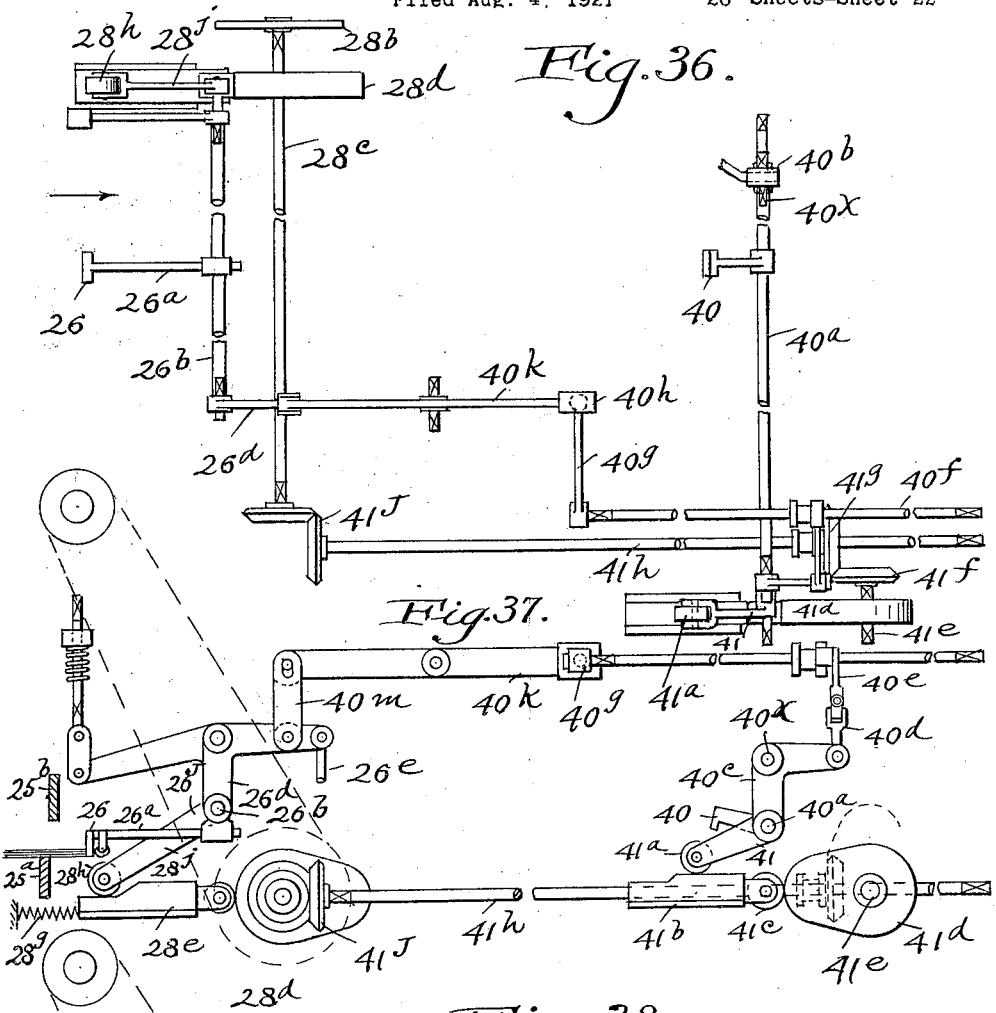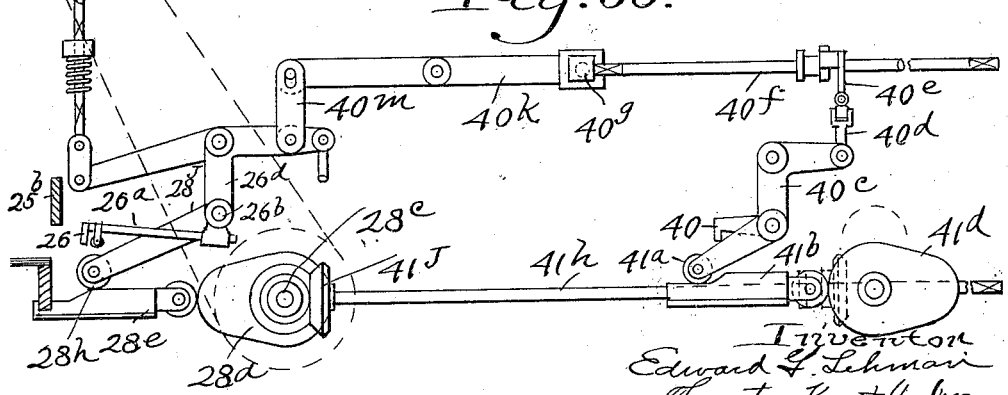

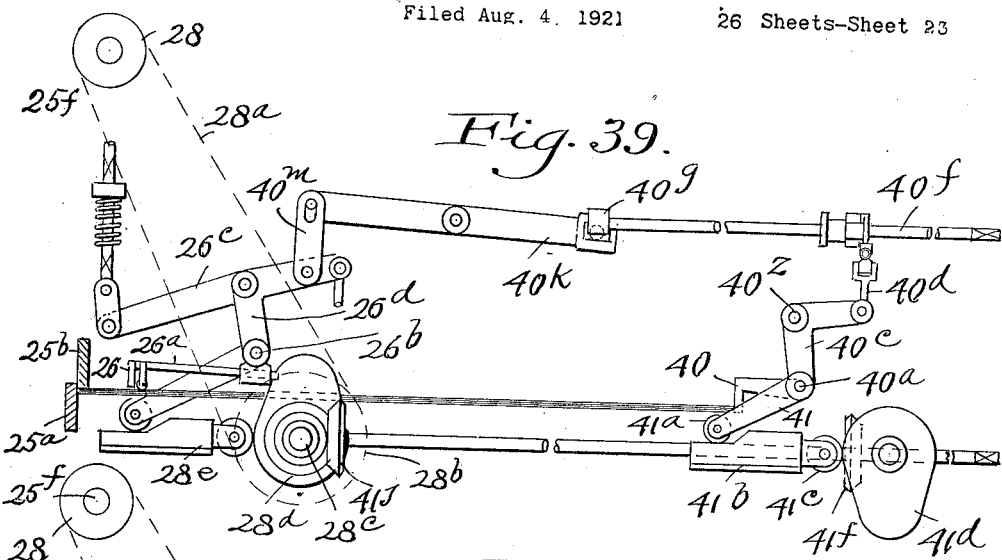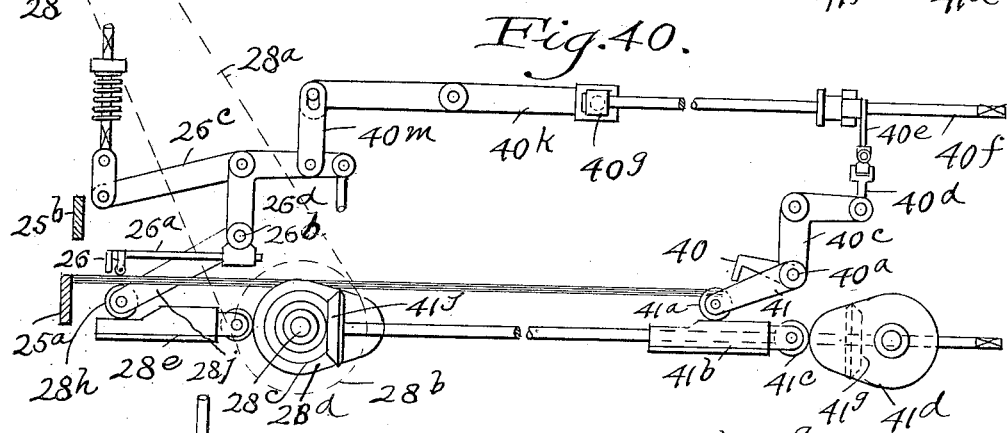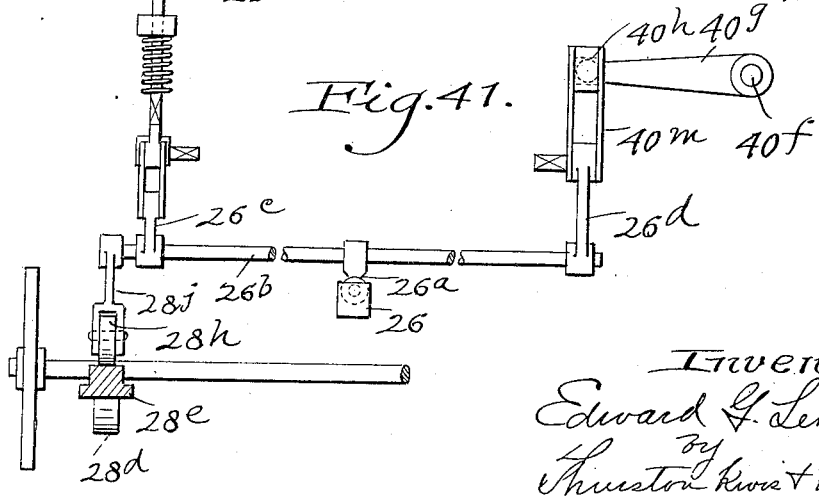

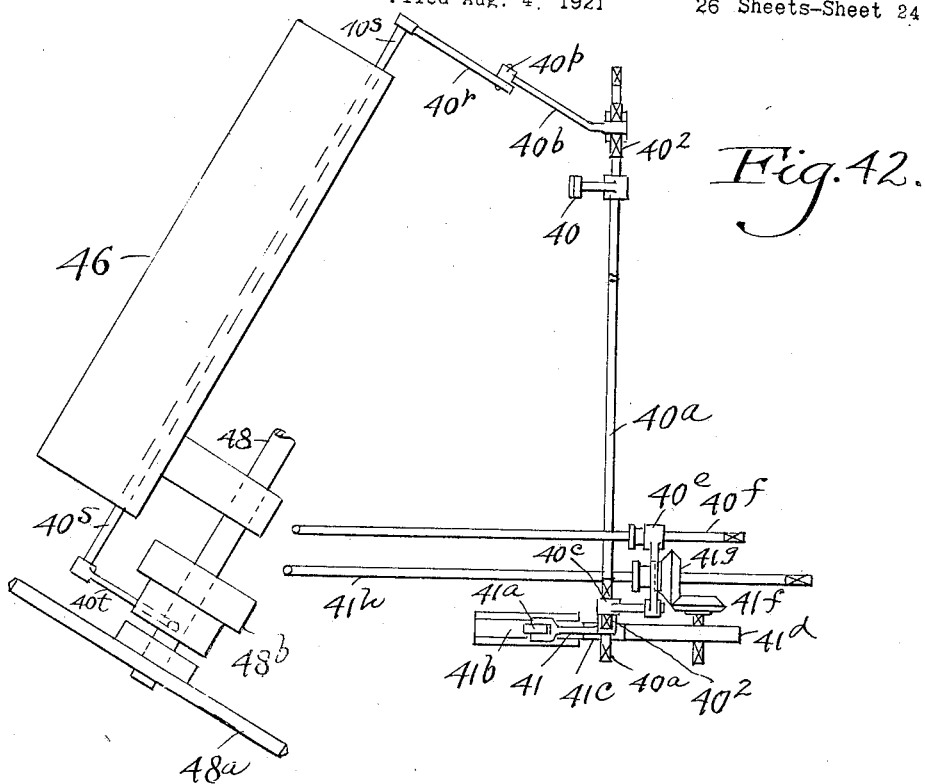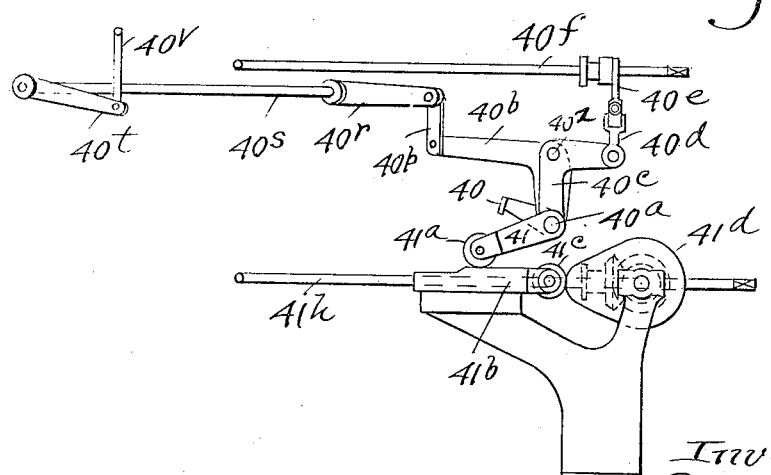

Aug. 12, 1924.
E. G. LEHMAN
SHEET OPENER
Filed Aug. 4, 1921        26 Sheets-Sheet 25
1,504,487
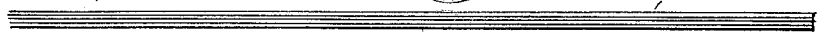
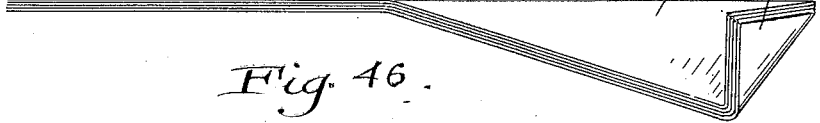
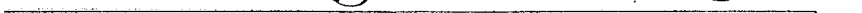
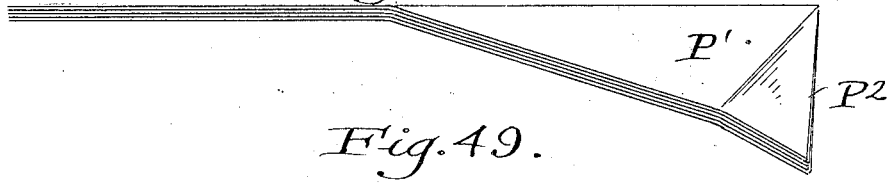
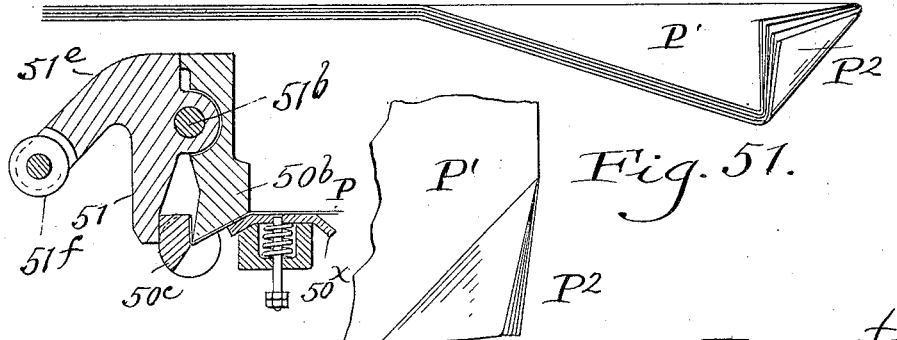

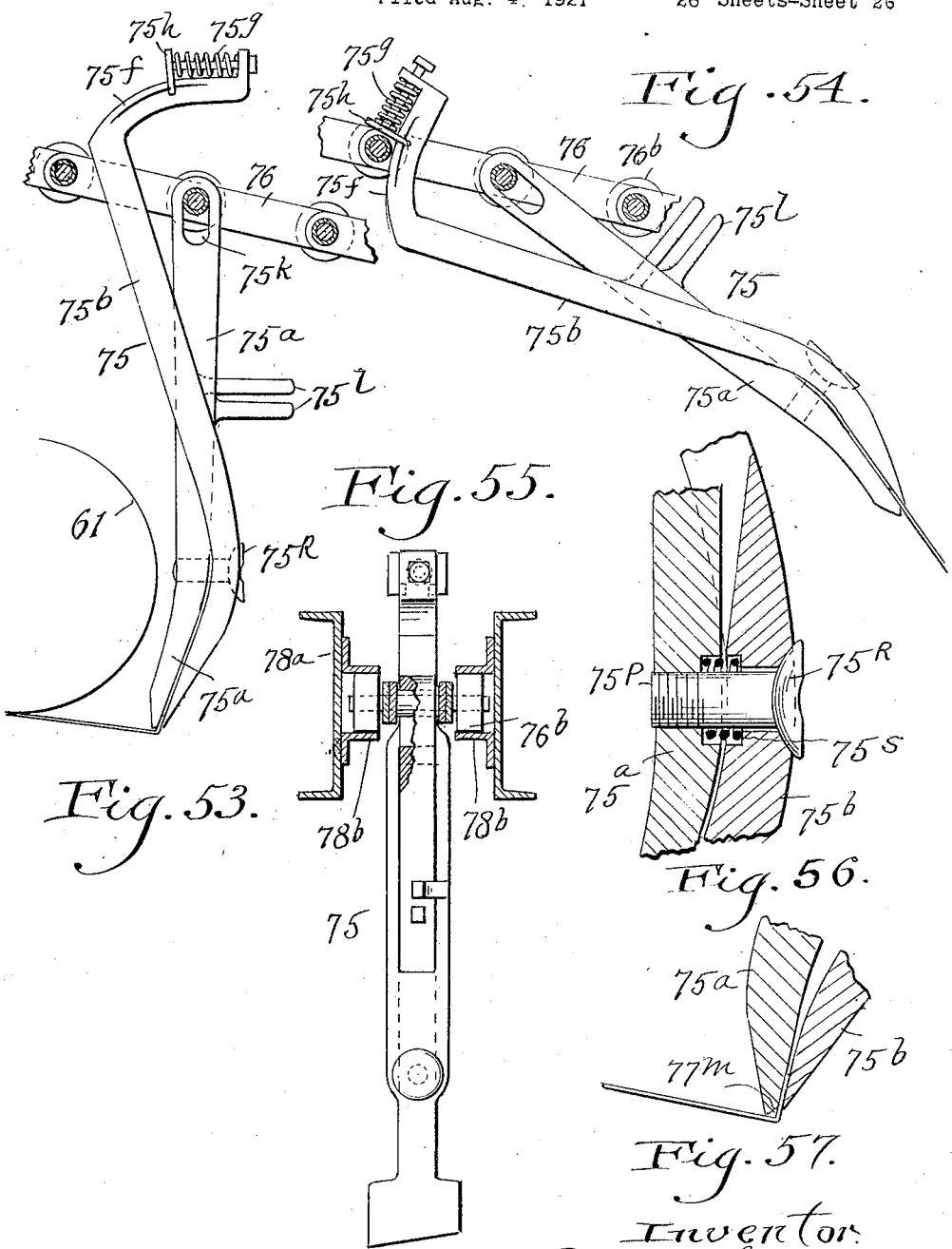

Patented Aug. 12, 1924.

1,504,487

UNITED STATES PATENT OFFICE.

EDWARD G. LEHMAN, OF CANTON, OHIO.

SHEET OPENER.

Application filed August 4, 1921. Serial No. 489,721.

*To all whom it may concern:*

Be it known that I, EDWARD G. LEHMAN, a citizen of the United States, residing at Canton, in the county of Stark and State of Ohio, have invented a certain new and useful Improvement in Sheet Openers, of which the following is a full, clear, and exact description.

This invention relates to a sheet opener, the primary function of which is to open a pack of rolled sheets by stripping off or separating the individual sheets of the pack.

It is customary in the production of metal sheets of rather thin gauge, to simultaneously roll a number of sheets in a pack, the number rolled together in the pack depending upon the gauge of the metal. This rolling of the sheets in a pack causes the sheets to adhere together and their separation is generally laborious and requires the services of a skilled operator.

After the pack is rolled, the edges and ends are sheared to trim or true the edges, and to cut the pack to the desired length. Then to open the pack an operator with a pair of tongs flexes or bends one corner of the pack back and forth a number of times until the sheets have been loosened or separated at the corner. Then with the tongs he grasps each sheet at a time at the loosened or opened corner, and separately strips them from the pack. At times it is very difficult to separate them, and it is necessary to resort to a long bladed knife which must be inserted under the sheet being stripped, to loosen it from the pack so that it can be removed with the tongs.

Many attempts have been made to devise machines for mechanically opening the pack or separating the sheets, but as far as I am aware, all such attempts have been unsuccessful, and I believe it is the universal practice in sheet mills to separate and remove the sheets by hand in the manner explained above.

The principal object of the present invention is to do away with this hand labor, and to separate or strip the sheets from the pack rapidly and effectively with a machine which is largely automatic in its operation.

Further the invention aims to provide a machine or apparatus composed of several co-ordinated units operating in predetermined relation, the units being so constructed, arranged and operated, that a pack of sheets can be inserted in one end of the apparatus, and as it is carried through, its edges are trimmed, its ends are sheared so as to cut the pack to the right length, one portion of the pack is opened preferably at the corner thereof, and then the pack passes on to the opener proper, which strips the sheets successively from the pack and deposits them one after another in a uniform manner on a platform or truck.

With the machine operated in the preferred manner, as stated above, it comprises four main units consisting of a slitter or edge trimmer which simultaneously trims both longitudinal edges of the pack, provision being made for adjusting for width of the pack; second, a shear which successively shears off the ends of the pack, there being associated with the shear, automatic stop devices which bring the several conveyors of the apparatus to a stop so that the shearing can take place in the desired manner, and so that the pack will be cut the right length, and so that the corner opener may be permitted to function properly; third, the corner opener which can be set for any length of pack, and serving, when the pack has been stopped to permit the rear end thereof to be sheared, to flex one corner at the forward end of the pack so as to open the sheets at the corner; and fourth, the sheet stripper or opener proper, to which the pack is automatically conveyed, and which serves to strip the sheets from the pack, the sheets being grasped one at a time, and pulled from the pack with the assistance if necessary, of knives working in conjunction with the sheet grasping devices, the latter conveying the sheets to the delivery point.

Although the machine in its preferred form embodies the units above referred to, operating as outlined in this brief fashion, nevertheless, the invention is not confined to the use of all these units, as all the units composing the machine involve novelty in themselves, or all of them may be used alone, or in combination with part or all of the other units.

The invention may be further briefly summarized as consisting in certain novel details of construction, and combinations and arrangements of parts which are described in the specification, illustrated in the accompanying drawings, and set forth in the appended claims.

Figure 2:
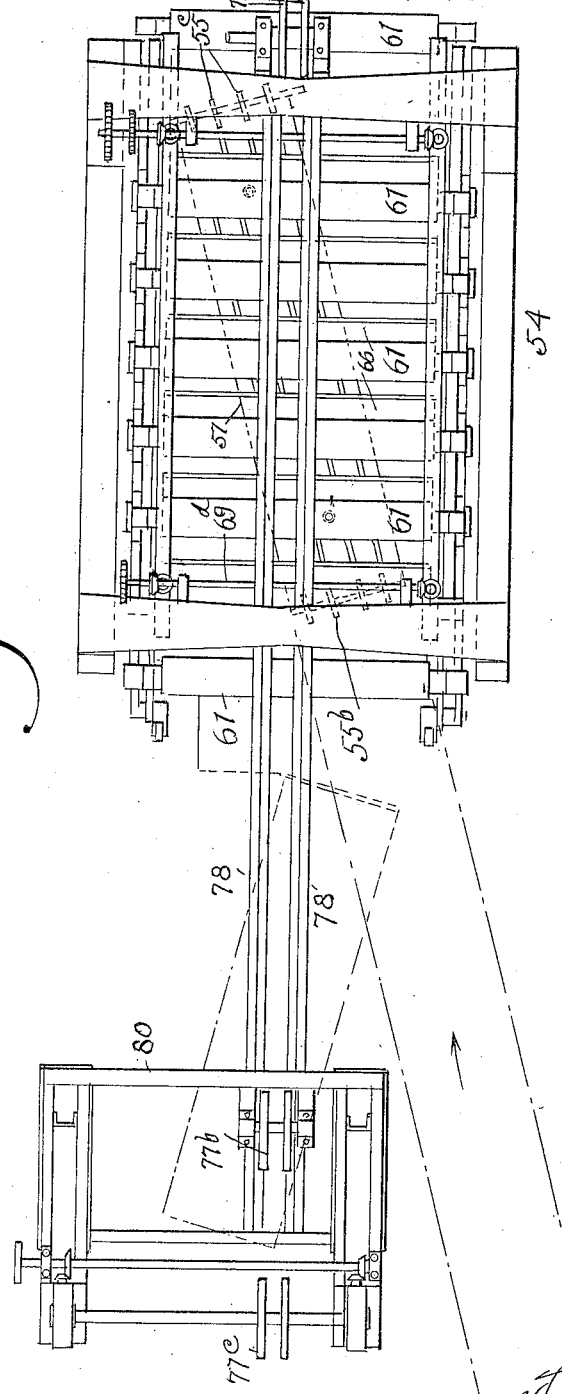
Figure 3:
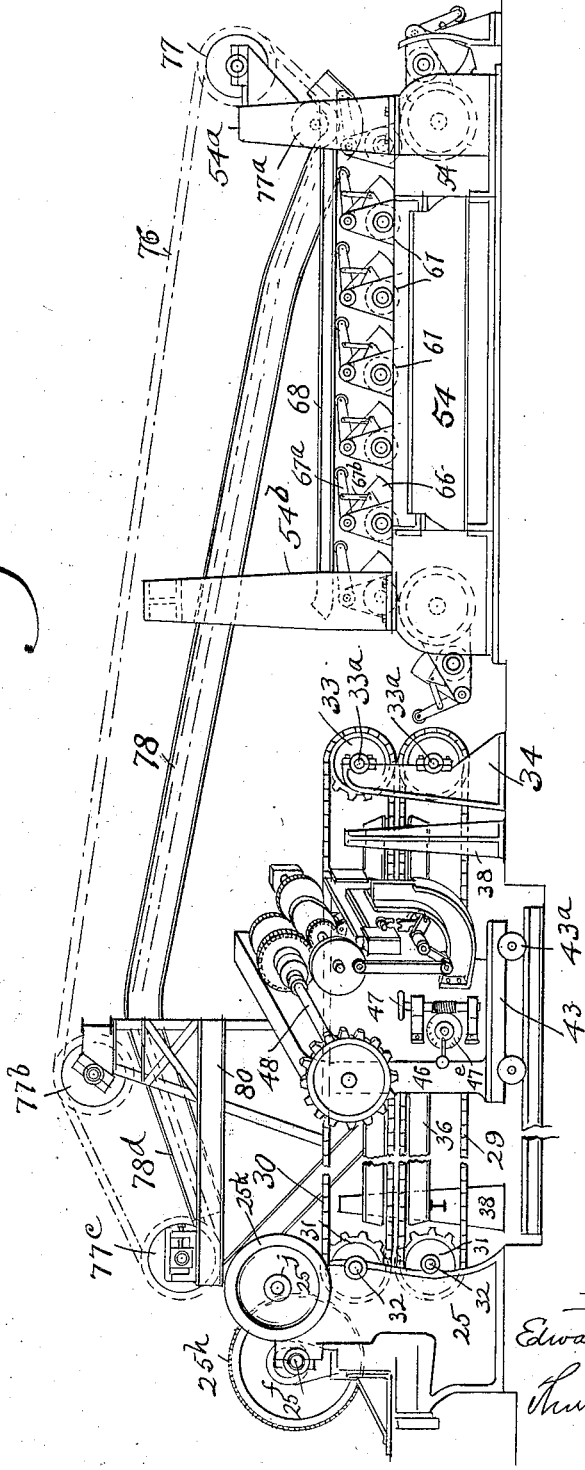
Figure 4:
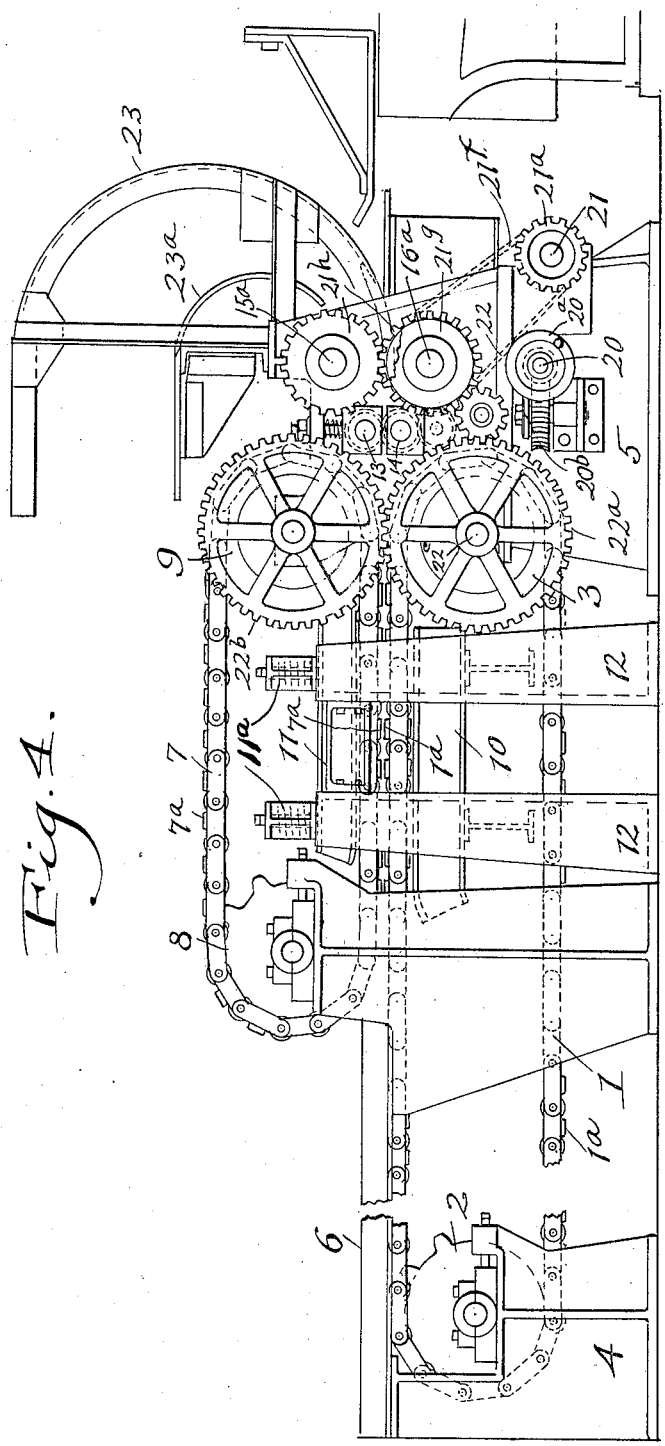
Figure 5:
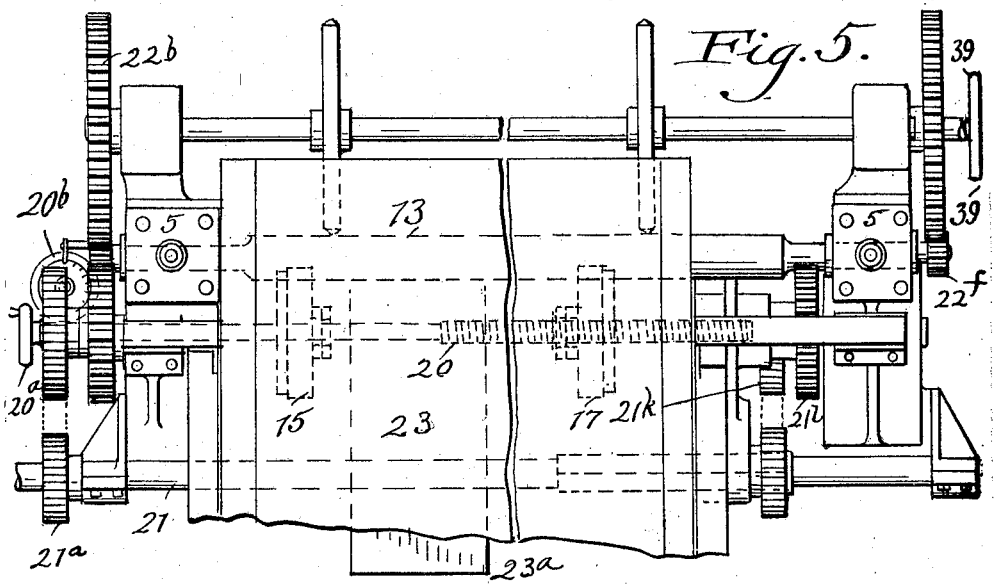
Figure 6:
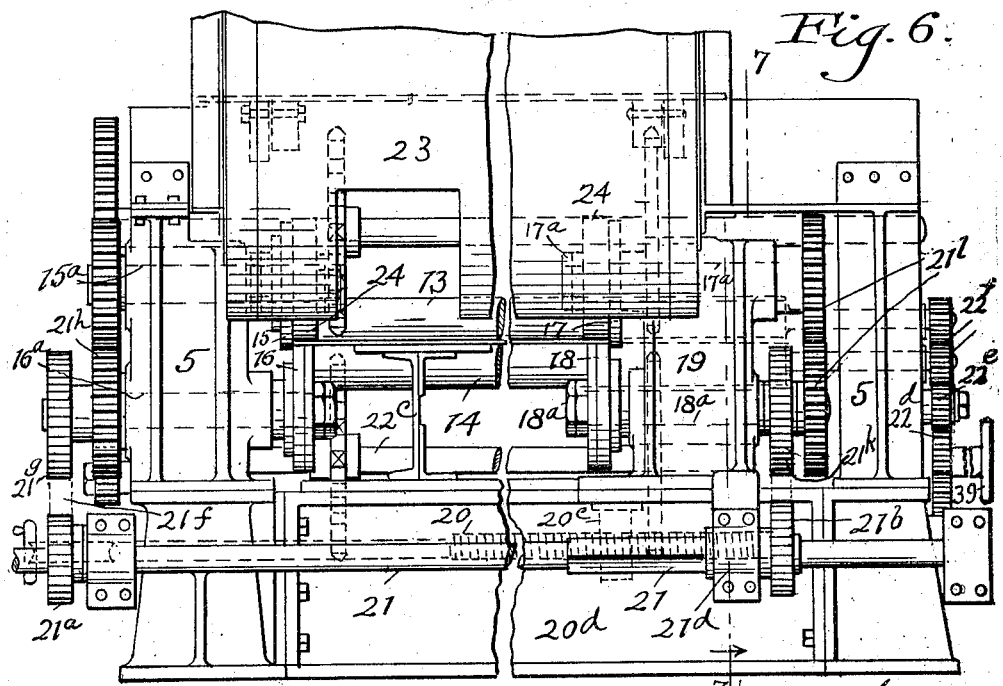
Figure 16:
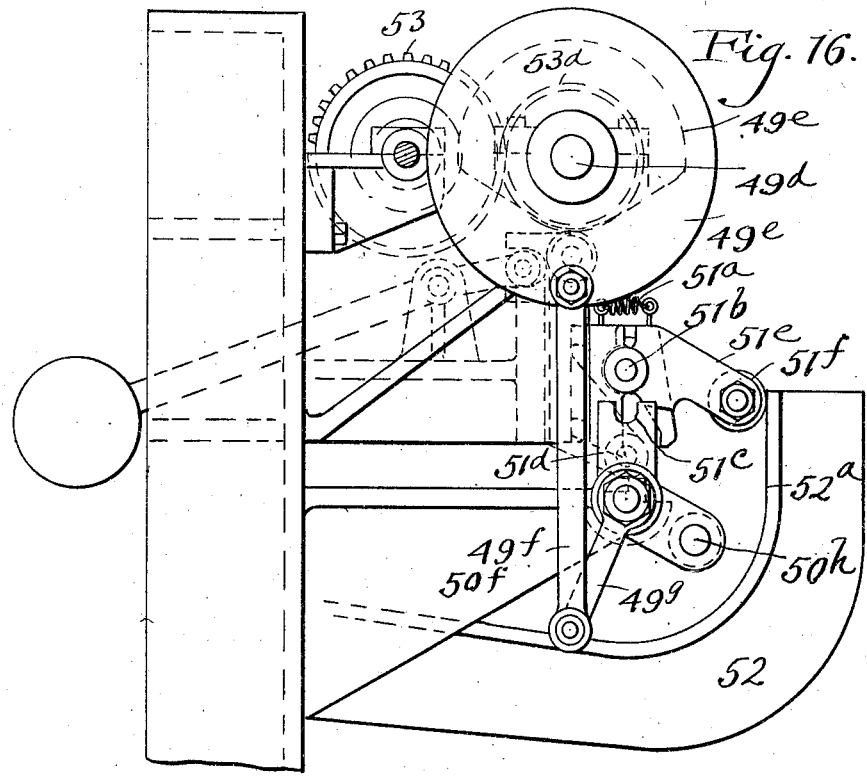
Figure 17:
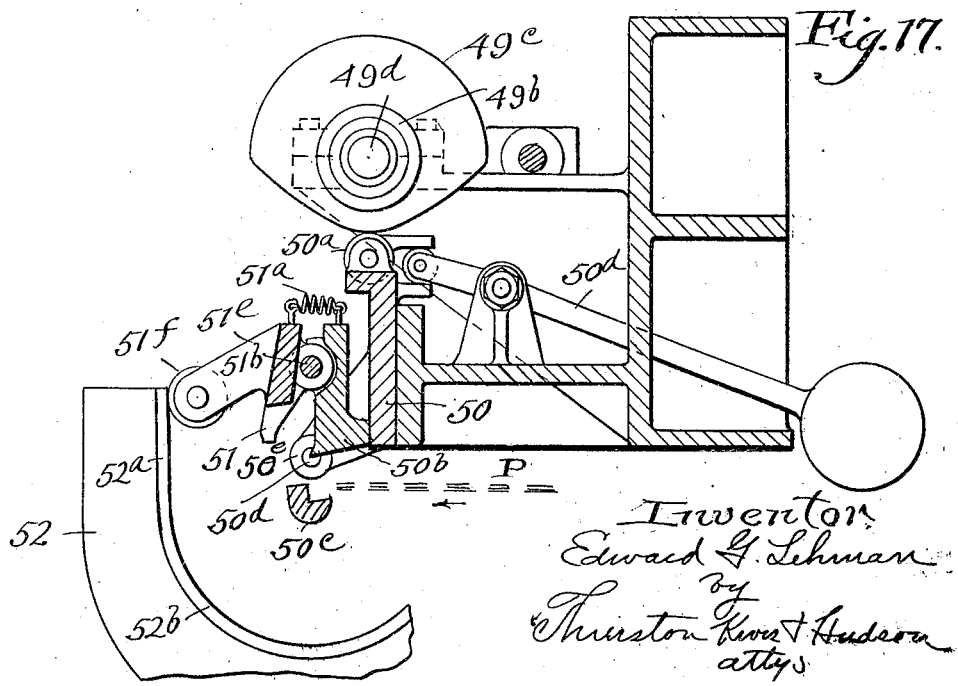
Figure 28:
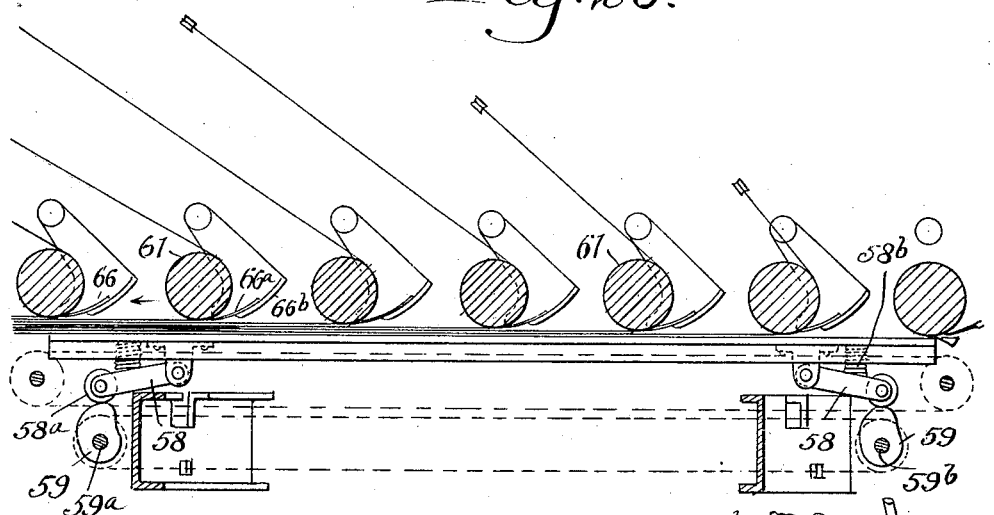
Figure 29:
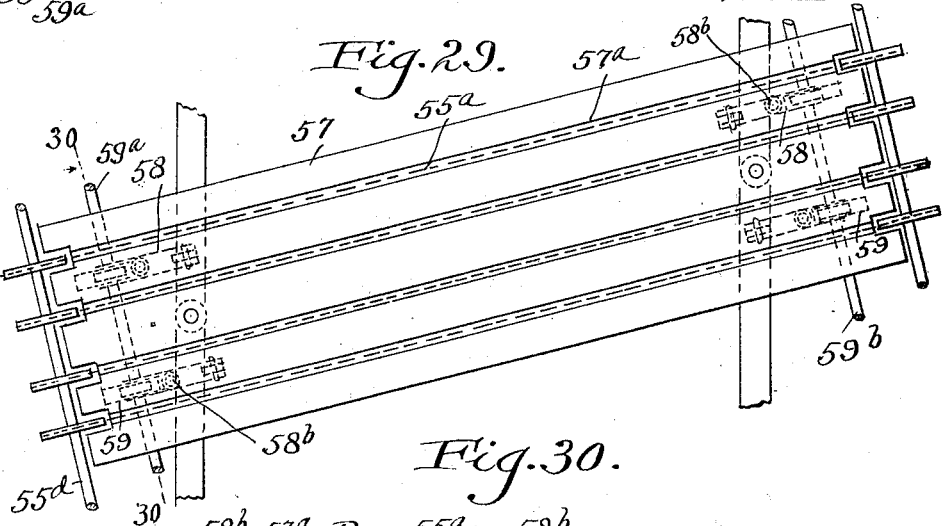
Figure 30:
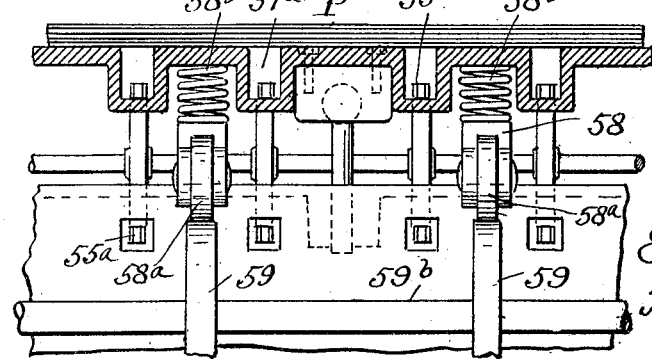

In the accompanying sheets of drawings which illustrate the preferred embodiment of the invention, Fig. 1 is a top plan view of the apparatus showing all but the stripper; Fig. 2 is a top plan view of the stripper; Fig. 3 is a side elevation of the apparatus, except the edge shearing mechanism or unit; Fig. 4 is a side view upon an enlarged scale of the edge trimming mechanism and a portion of the shearing unit, the unit here shown adjoining the left hand end of the unit shown in Fig. 3; Fig. 5 is a top plan view of the shearing mechanism omitting the conveyor shown in Fig. 4; Fig. 6 is a side elevation of the shearing mechanism shown in Fig. 5; Fig. 7 is a sectional view substantially along the line 7—7 of Fig. 6; Fig. 8 is a sectional view taken at right angles to Fig. 7, through two of the cutters of the edge trimmer; Fig. 9 is a detail side elevation of a hold-down roll associated with one of the cutters of Fig. 8; Fig. 10 is a side view of the shearing and corner opening units, the apparatus here shown forming a continuation of the adjoining left hand end of the trimming unit shown in Fig. 4; Fig. 11 is a front elevation of the shearing mechanism; Fig. 12 is a side view of the stop mechanism used with the shearing mechanism of Fig. 11; Fig. 13 is a vertical sectional view through the shearing unit of Fig. 11; Fig. 14 is a front elevation of the corner opener; Fig. 15 is a top plan view of the same; Fig. 16 is a side elevation of the principal parts of the corner opener; Fig. 17 is a sectional view through the same, the section being taken substantially along the line 17—17 of Fig. 14; Figs. 18 to 22 inclusive, are fragmentary views partly diagrammatic, showing five different positions of a part of the corner opener, the part here illustrated being the mechanism which grasps and flexes the corner of the pack; Fig. 23 is a side elevation of the principal part of the stripper omitting the left hand portion of the overhead chain carrying the sheet tongs; Fig. 24 is a side elevation of the left hand portion of the stripper, not shown in Fig. 23, this view forming in effect a continuation of Fig. 23; Fig. 25 is a transverse sectional view through the stripper, the section being taken substantially along the irregular line 25—25 of Fig. 23, looking in the direction indicated by the arrows; Fig. 26 is an end elevation; Fig. 27 is a fragmentary side elevation showing particularly one of the stripper rolls and a separating knife associated therewith; Fig. 28 is a diagrammatic sectional view through a portion of the stripper unit, the section being at right angles to the stripper rolls and illustrating the manner in which the sheets are successively stripped from the pack; Fig. 29 is a plan view of the stripper table; Fig. 30 is a sectional view through the stripper table substantially along the line 30—30 of Fig. 29, this view showing particularly the elevating mechanism for the stripper table; Fig. 31 is a diagram illustrating the driving mechanism for the principal parts of the apparatus; Fig. 32 is a plan view of the left hand portion of the drive and stop mechanism; Fig. 33 is a side elevation of the same; Fig. 34 is a plan view of the remainder of the drive and stop mechanism not shown in Fig. 32, this view forming a continuation of, and adjoining the right hand end of Fig. 32; Fig. 35 is a side elevation of a portion of the same; Fig. 35$^a$ is a side elevation of the remainder of the parts of Fig. 34, not shown in Fig. 35; Fig. 35$^b$ is a sectional view substantially along the line 35$^b$—35$^b$ of Fig. 35$^a$; Fig. 36 is a plan view showing particularly the stop mechanism for the shear and corner opening units; Figs. 37, 38, 39 and 40 are side elevations of the same shown in different positions; Fig. 41 is an end view looking toward the right of Fig. 36, omitting some of the parts; Fig. 42 is a top plan view of the control mechanism shown at the right hand side of Fig. 36, but showing some additional parts, particularly the control for the corner opener clutch; Fig. 43 is a side view of the same; Fig. 44 is an edge view of the pack before the corner has been opened; Figs. 45, 46, 47, 48 and 49 are views showing different positions of the corner of the pack with the plunger and die of the corner opener in the positions shown in Figs. 18 to 22; Fig. 50 is a view illustrating the manner in which the sheets are separated at the bent corner of the pack after the corner opening operation; Fig. 51 is a plan view of the corner of the pack after the sheets have been separated at the corner; and Fig. 52 is a sectional view of the plunger and die of the corner opener with an adjunct which is associated therewith to lift the corner of the pack above the die after the corner opening operation; Fig. 53 is an enlarged view of one of the tongs in the preferred form thereof, and a portion of the tong chain with the tongs in the position which they occupy at the very start of the stripping motion; Fig. 54 is a similar view showing how the tongs are inclined while in the act of stripping a sheet from the pack; Fig. 55 is an edge view of the tongs; Fig. 56 is an enlarged fragmentary sectional view showing the preferred way of pivoting together the two arms of the tongs, and Fig. 57 is an enlarged sectional view showing the jaws of the tongs.

The pack of sheets to be opened is started from the left hand end of the apparatus as the same is viewed in Fig. 1, and travels through to the right hand end shown in Fig. 3. The left hand end of the apparatus con sists of the edge trimming unit, which is shown on a large scale in Figs. 4, 5, 6, 7, 8 and 9, and reference will now be had particularly to these figures. The pack when started in the machine, is placed upon an endless chain conveyor 1, which travels about sprocket wheels 2 and 3 (see Fig. 4) supported in housings 4 and 5. Along one side of the conveyor 1 is a fixed upright gauge 6, against which one edge of the sheet pack is placed. As the pack travels inwardly it passes beneath a hold-down conveyor 7, which is somewhat shorter than the conveyor 1, and travels about sprockets 8 and 9. Both conveyors have cross bars $1^a$ and $7^a$ respectively, which firmly hold the pack as it is traveling forwardly. Between the sprockets 2 and 3 of the lower conveyor and the sprockets 8 and 9 of the upper conveyor is a lower supporting rail 10 (Fig. 4) and an upper supporting rail 11, which are supported by housings 12, the rail 11 being yieldingly supported and held against the pack by springs $11^a$ as shown in Fig. 4, so as to compensate for different thicknesses of packs, the function of these rails being to cause the conveyors to hold the pack firmly as it passes through the trimming cutters. These conveyors flatten out the pack, removing the transverse waves with which the packs are usually provided after being rolled.

Just before the pack reaches the cutters, the pack passes between a pair of supporting and driving rolls 13 and 14 (Figs. 4, 5, 6 and 7) which are supported by the housing 5, the upper roll being yieldable to compensate for packs of different thicknesses. Then just beyond these rolls 13 and 14 the pack passes through two pairs of rotary cutters which trim off the edges of the pack. The two pairs of trimming cutters are shown at 15 and 16, (see left hand side of Fig. 6) and 17 and 18 (see middle left hand side of Fig. 6). The cutters 15 and 16 are mounted on shafts $15^a$ and $16^a$ (Fig. 8) which are supported so that the cutters 15 and 16 remain in fixed position as far as their supporting housing 5 which supports them is concerned, but the cutters 17 and 18 are adjustable laterally to take care of packs of different widths. These cutters are mounted on shafts $17^a$ and $18^a$ supported by a laterally adjustable housing 19 (see particularly Fig. 7) adjustable laterally of the machine by an adjusting screw 20 which extends horizontally through the frame or housing 5 of the edge trimmer, and is adapted to be adjusted by a hand wheel $20^a$ (Figs. 4, 5, 6 and 7). A rotary dial, indicated by the reference character $20^b$ and adapted to be turned by the feed screw 20, handle $20^a$ and worm gearing, enables the operator to adjust the distance between the two pairs of rotary trimmers to suit any particular width. This feed screw 20 engages the equivalent of a nut $20^c$, (see Figs. 6 and 7) which nut depends from the housing 19 which is slidable in ways of a bed $20^d$ (Fig. 7) forming part of the frame of the edge trimmer.

The two conveyors 1 and 7, the rolls 13 and 14, and the edge trimmers are all driven from a shaft 21 (Figs. 4, 5, 6 and 7) which extends horizontally across the lower part of the frame or bed of the edge trimming unit. The manner in which this shaft is driven intermittently, will be explained subsequently. This shaft 21 has on its driven side, shown in Fig. 4, a sprocket $21^a$ (see also Fig. 32) for driving the fixed rotary cutters 15 and 16, and likewise it has near the opposite side a sprocket $21^b$ which is not directly mounted on the shaft 21, but is carried by a bushing $21^c$ having a square opening slidingly engaging a squared portion of the drive shaft 21, (Figs. 6 and 7) this bushing being carried by an arm or extension $21^d$ of the adjustable housing 19, so that as the housing 19 is adjusted to vary the position of the cutters 17 and 18, the driving sprocket $21^b$ is at the same time adjusted. The sprocket $21^a$ on shaft 21, by a chain $21^f$ drives a sprocket $21^g$ (Figs. 6 and 32) on the outer end of the shaft $16^a$ carrying the cutter 16, and motion is transmitted from this shaft $16^a$ to shaft $15^a$ by gearing $21^h$. Similarly the adjustable sprocket $21^b$ which is also driven by the shaft 21, drives a sprocket $21^k$ on the adjustable shaft $18^a$ carrying the cutter 18, and motion is transmitted from the cutter shaft $18^a$ to the cutter shaft $17^a$ by gears $21^l$. It will be seen therefore, that though both pairs of rotary cutters are driven from the same shaft 21, nevertheless, the method of drive is such as to permit one pair of cutters to be moved laterally to accommodate different widths of packs.

Motion is transmitted from the lower gear $21^h$ to drive both the conveyors 1 and 7, an idler sprocket 22 (Figs. 4 and 32) transmitting power from this gear to a gear $22^a$ on the conveyor shaft $22^c$ carrying the sprockets 3, and from this gear motion is transmitted to an upper gear $22^b$ on the shaft carrying the sprockets 9 of the upper conveyor. The lower conveyor shaft $22^c$ extends across the trimming unit, and at its far end from the end shown in Fig. 4 (see Fig. 7) it is provided with a gear $22^d$ which through an idler $22^e$ transmits motion to one of two meshing gears $22^f$ on the ends of the pack driving rolls 13 and 14 (Figs. 6 and 7). The teeth of these two meshing gears $22^f$ are sufficiently long to transmit power one to the other notwithstanding the slight up and down movement of the upper roll.

As the edges are trimmed off the sides of the pack, the scrap is preferably guided upwardly and rearwardly by a guide plate 23 beneath which I provide a guard $23^a$ to prevent the scrap dropping onto the gearing.

As the scrap passes up around this curved guide plate 23 it will be removed by an attendant.

The two upper edge trimmers 15 and 17 have associated with them, hold-down rolls 24 (Figs. 8 and 9) which include a central portion $24^a$ which is driven with the cutter, and a peripheral portion $24^b$ yieldingly connected to the inner portion by springs $24^c$ (see Figs. 8 and 9) the construction being such that as the sheet is being trimmed, these rolls hold the pack down firmly against the lower cutters 16 and 18, while the edges of the pack are being trimmed off.

Next the pack passes into the shear or second unit, and first the forward end is trimmed, and then the rear end is cut off so that the pack will be of the right length, though just before the shearing operations the pack shifting conveyors of the edge trimmer, corner opener, and stripper are stopped, as will be subsequently explained.

The shear itself is of conventional form including a frame 25, supporting a stationary shear blade $25^a$ (Figs. 11 and 13) with which co-operates a vertically movable shear blade $25^b$ carried by the cross-head $25^c$, the motion of which can be smoothed if desired, by a counter-weight carried by a lever $25^d$, though this is not material to the invention. The cross-head is operated by eccentrics $25^e$ on a shear operating shaft $25^f$, supported at the top of the frame. This shaft, which is operated intermittently by suitable clutch mechanism designated as a whole by the reference character $25^g$, by a constantly revolving gear $25^h$ which is driven by a pinion $25^i$, on a shaft $25^j$ having a fly-wheel $25^k$ which is rotated by a belt $25^{ll}$ (Fig. 33) driven by a pulley $25^m$ (Fig. 32) on the lower horizontal shear operating shaft $25^p$. This shaft is connected by bevel gears $25^r$ (Figs. 32 and 33) to a worm drive shaft 27 which drives the edge trimmer, shear, corner opener and table elevating mechanism of the stripper as will be explained later.

When the forward end of the pack passing in the direction indicated by the arrow in Fig. 13, passes beyond the shearing blades $25^a$ and $25^b$, it engages the first of two stops, the function of each of which is to stop all pack conveyors of the entire apparatus, also the edge trimming cutters, and to trip the shear, the second stop performing the additional function of tripping the corner opener, as will be explained. The first stop is shown at 26, this stop being carried by a rod $26^a$ carried at the center of a shaft $26^b$ (see particularly Figs. 11, 12 and 36) extending across the shear unit. This rod is supported at opposite ends by bell-cranks, one shown at $26^c$ in Fig. 12, and the other at $26^d$ in Fig. 33. The bell-crank $26^c$ operates the shear trip in the manner indicated in Figs. 11 and 12, which show one arm of the bell-crank $26^c$ connected to the clutch mechanism $25^g$ already referred to. When the clutch is operated, the shear blade is lowered, and then elevated, and then the shear is stopped by the constantly rotating gear $25^h$ being unclutched from the shaft $25^f$. This clutch is of the usual type employed in presses and shears, being automatically thrown out when the shaft $25^f$ makes one complete revolution. The other bell-crank $26^d$ causes the stopping of the conveyors, so that the pack will be stationary when being sheared. By reference to Fig. 33 it will be seen that one arm of this bell-crank $26^d$ has connected to it a downwardly extending rod $26^e$, the lower end of which is connected to one end of a lever $26^f$ pivoted at the lower part of the shear frame 25. The other end of this lever is connected to a bell-crank $26^g$, (Fig. 32) the upstanding arm of which is connected by a link $26^h$ to a sliding clutch yoke $26^j$ which operates a mechanical clutch $26^k$, (shown conventionally in Fig. 32) so as to disconnect the drive shaft 21 of the edge trimmer from a gear $26^m$, driven by a jack shaft $26^p$ connected by bevel gearing $26^r$ to the main drive shaft 27 which extends lengthwise of the edge trimmer, shear and corner opener, and operates all these units, this shaft 27 being driven by a motor $27^a$. As soon as the forward end of the pack is sheared off and the movable shear blade rises, the bell-cranks $26^c$ and $26^d$ and the parts which throw out the clutch swing back to normal position, and the clutch $26^k$ is automatically thrown in, whereupon the operation of the conveyors and slitting cutters is continued.

However, after the forward end of the pack is sheared off, before the pack can proceed, it is necessary that the stop 26 be elevated from the path of movement of the pack, and to accomplish this, the following mechanism has been provided: On one end of the shear operating shaft $25^f$ I provide a sprocket 28 (see Figs. 1, 11 and 32) which through a chain $28^a$ drives a lower sprocket $28^b$ which is twice the size of the sprocket 28, and is mounted on a shaft $28^c$ (Fig. 32) which extends across the lower part of the frame of the shear unit. On this shaft is provided a cam $28^d$ (see Figs. 36 to 40) which is engaged by a roller on a slide $28^e$ mounted in a bracket $28^f$ on the left hand side of the shear frame, as viewed in Fig. 11. A spring or equivalent device, indicated conventionally at $28^g$ in Fig. 37 keeps the roller of the slide in engagement with the periphery of the cam. Riding on the top of this slide is a roller $28^h$ carried by an arm $28^j$, secured to one end of the shaft $26^b$ which carries the stop 26, and therefore the position of the stop, as far as height is concerned, is determined by the height of the slide which the roller engages. This slide has a portion of reduced thickness, and an elevated portion, and when the roller engages the reduced portion the stop is in position to stop the on-coming pack, as shown in Fig. 37. When the roller engages the elevated portion of the slide, the stop is elevated to the position shown in Fig. 38. The shape of the cam and its rate of movement are such that after the shear blade is lowered, and is traveling upwardly, the cam shifts the slide so as to elevate the stop and thereby permit the pack to move forward through the rest of the apparatus. It may be mentioned at this point that this slide 28$^e$ operates in conjunction with a second or forward slide which controls the elevation of the forward stop.

The pack now passes forward between a pair of conveyors consisting of a lower conveyor 29 and an upper conveyor 30 (Figs. 1 and 3) passing about rear sprockets 31 on shafts 32, which in this instance are supported in bearings mounted in the shear frame 25, and front sprockets 33, (see Fig. 3) on shafts 33$^a$ mounted in bearings supported by standards 34. These conveyors, like the conveyors of the edge slitting unit, are provided with cross-bars 35 which firmly hold the pack as it is traveling forwardly, and in order that the pack engaging sections of the conveyors may be held in proper position between the sprockets, I provide as in the first instance, between the sprockets, lower supporting rails 36, and upper hold-down rails 37, carried by standards 38, the rails 37 being preferably pressed down yieldingly, as in the first instance, to allow for the passage of packs of different thicknesses.

The conveyors 29 and 30 are driven from the shaft 22$^c$ of the lower conveyor 1 of the edge slitting unit, and for this purpose the shaft 22$^c$ is extended outwardly on one side of the machine, and is provided with a sprocket 39, which through a chain 39$^a$ drives a sprocket 39$^b$ on the shaft 32 of the lower conveyor 29. Motion is transmitted to the upper conveyor by gears 39$^c$ indicated by dotted lines in Fig. 10.

The pack is moved forwardly until its front end engages the second stop 40 already referred to, this stop being in line with, but at an adjustable distance forward of the first stop 26. This stop 40 is on an arm which is fixed to a shaft 40$^a$ supported by two bell-cranks 40$^b$ and 40$^c$, the former being best shown in Fig. 43 and the latter best shown in Figs. 37 and 43. Both bell cranks are preferably mounted on pins or short shafts 40$^z$, carried by the corner opener so that the stop 40 will be adjustable back and forth with the corner opener.

It will be observed (Figs. 42 and 43) that one arm of the bell-crank 40$^c$ is connected by a link 40$^d$ to an arm 40$^e$, splined to move lengthwise of a shaft 40$^f$ suitably supported in bearings, not shown, alongside the apparatus. The rear end of this shaft carries an arm 40$^g$ (Fig. 41) having a ball and socket connection at 40$^h$ with the forward end of a lever 40$^k$ (Fig. 39) whose rear end has a pin and slot connection with a link 40$^m$ connected to the bell-crank 26$^d$ of the shear unit, the construction and arrangement being such that through the parts described, when the pack engages the second stop 40, the mechanical clutch 26$^k$ controlling the movement of the conveyors is stopped so as to stop the movement of the pack, and the shear mechanism is again tripped, precisely as when the pack engaged the first stop 26, the result being that the rear end of the pack is sheared off and the pack is cut to length which can be varied by shifting the position of the stop 40 along with the corner opener. The pin and slot connection between the lever 40$^k$ and the link 40$^m$ allows the first stop 26 to rock the bell-cranks 26$^c$ and 26$^d$ independently of the mechanism connecting the forward stop with the bell-crank 26$^d$. In other words, the movement of either stop by the forward end of the pack stops the conveyors and trips the shear so that its movable blade will descend and cut off the end of the pack.

Although before the second stop 40 is elevated to permit the continued further movement of the pack, the corner opener functions, it might be mentioned at this time that the second stop 40 is elevated to permit further forward movement of the pack in precisely the same manner and with mechanism co-ordinated with the elevating slide associated with the first stop 26. To this end the shaft 40$^a$ carrying the stop 40 is provided at one end with an arm 41 corresponding to the arm 26$^j$ of the shear unit, the arm 41 having at its lower end a roller 41$^a$ which engages a slide 41$^b$ similar to the slide 28$^e$, and provided at one end with a roller 41$^c$ engaging a cam 41$^d$ similar to the cam 28$^d$ of the shear unit, and displaced with respect thereto 180°. This cam 41$^d$ is mounted on a short shaft 41$^e$ (see Fig. 36) and is rotated by bevel gears 41$^f$ and 41$^g$, the latter being splined on a shaft 41$^h$ which like the shaft 40$^f$ extends alongside the apparatus and is supported in suitable bearings, not shown. This shaft at its rear end is connected by bevel gearing 41$^j$ to the shaft 28$^c$ carrying the cam 28$^d$ of the shearing unit which operates the slide 28$^e$. It will be understood that the cam 41$^d$, slide 41$^b$, stop 40 and part associated therewith are movable with the corner opening unit, and for that reason the lever 40$^e$ and the gear 41$^g$ are splined on the shafts 40$^f$ and 41$^h$ respectively. The slide 41$^b$ and cam 41$^d$ may be mounted on an extension of the corner opener such as shown at 41$^x$ in Fig. 43.

With this construction, when the first stop 26 is down, the second stop 40 is elevated, and when the slide 28ᵉ is shifted to elevate the stop 26, simultaneously the slide 41ᵇ is shifted to lower the second stop 40, and vice versa. It will be sufficient at this point to state that after the pack has engaged the stop 40, and the rear end thereof is sheared off, and the one corner at the forward end of the pack is opened by the corner opener, next to be explained, the second stop 40 is elevated to permit the pack to be moved forwardly into the stripper unit.

I will next describe the so-called corner opener which constitutes a very important part of the apparatus. This corner opener is designed to first bend and then flex, i. e., twist or turn back and forth one corner of the forward end of a pack so as to bend up the individual sheets at this point, this operation taking place at the forward end of the pack simultaneously, or substantially simultaneously with the operation of the shear in shearing the rear end of the pack, both the corner opening and rear end shearing taking place immediately after the pack comes up against the second stop 40.

The corner opener, best shown in Figs. 1, 3, 10 and 14 to 22, includes a base 43 having track wheels 43ᵃ, adapted to be adjusted along the rails 44 of a sub-base 45, this adjustment being provided in order that the machine may be employed for packs of different length. The base 43, and in fact, the major portion of the corner opener is located at one side of the conveyors 29 and 30, a portion of the frame of the corner opener overhanging these conveyors, as clearly shown in Fig. 1. At this point it will be noted that the conveyor 29 is somewhat wider than the conveyor 30, and that both conveyors are narrower than the edge trimmer conveyors 1 and 7. This arrangement is provided in order that one edge, and therefore, one front corner of the pack will be free of the conveyors 29 and 30 in order that this corner may be operated on by the corner opener.

For the purpose of adjusting the position of the corner opener, the corner opener frame 46 is provided with an adjusting wheel 47, (Fig. 10) mounted on a shaft 47ᵃ, which at its lower end is connected by bevel gearing 47ᵇ to a shaft 47ᶜ extending horizontally beneath the bed 43, and provided with pinions which engage racks 47ᵈ carried by the sub-base 45. An indicator dial 47ᵉ is rotated by the shaft 47ᵃ, and this dial with the co-operation of a stationary indicator 47ᶠ enables the operator to accurately adjust the position of the corner opener for any particular length of pack.

At the top of the frame 46 of the corner opener is an operating shaft 48 which is provided at its outer end with a normally loose but constantly rotating sprocket wheel 48ᵃ designed to be clutched to the shaft 48 so as to drive it, and then to be unclutched after a complete revolution has been made by a clutch indicated conventionally at 48ᵇ, this clutch and the control mechanism being like that employed with the shear, and the clutch being controlled or tripped by the engagement of the front end of the pack with the stop 40 and subsequent movement of the stop 40. Although the movement of the stop 40 may be utilized to trip the clutch just referred to by different mechanisms, I employ for that purpose the bell-crank 40ᵇ which supports one end of shaft 40ᵃ carrying stop 40. To that end one arm of the bell-crank (see Figs. 42 and 43) is connected by a link 40ᵖ to an arm 40ʳ at one end of a shaft 40ˢ (see Figs. 42 and 43) suitably supported by the frame of the corner opener, and provided at its opposite end with an arm 40ᵗ to which is connected the clutch controlling rod 40ᵛ. When this clutch opener is operated the shaft 48 of the corner opener is caused to make one complete revolution, whereupon the clutch is thrown out.

This sprocket wheel is adapted to be driven continuously by the main shaft 27 extending alongside the machine, as already explained, and preferably motion is transmitted from this shaft by bevel gearing 48ᶜ to a short shaft 48ᵈ (see Fig. 32) containing a driving sprocket wheel 48ᵉ (Fig. 33) which is connected to the upper sprocket wheel 48ᵃ by a chain 48ᶠ.

It might be mentioned at this point that the various shafts and axes of the operating parts of the corner opener are inclined in two directions with respect to the length of the conveyor as already referred to, and therefore, with respect to the path of movement of the pack being operated on. These parts are inclined forwardly when viewed from the top (see Fig. 1) and they are inclined upwardly when viewed from the front or rear, as clearly shown in Fig. 14.

This shaft 48, at the top of the corner opener has fixed to it a gear 49 meshing with a gear 49ᵃ of equal size, which is secured to a sleeve 49ᵇ carrying a cam 49ᶜ, the outline of which is shown clearly in Fig. 17, the sleeve being mounted on a counter shaft 49ᵈ. The purpose of this cam 49ᶜ is to lower a slide 50, having at the top a roller 50ᵃ engaging the periphery of the cam, this slide carrying a corner bending punch 50ᵇ which co-operates with a die 50ᶜ which is located below the punch and supported by the frame of the corner opener to give a double bend to the corner of the pack, which corner overlies the die when the pack is brought to a stop by the forward stop 40. The roller 50ᵃ is kept in engagement with the periphery of the cam by a counter-weighted lever 50ᵈ supported by the frame of the corner opener and connected to the slide as shown in Fig. 17.

With the parts viewed as in Fig. 17, the pack, designated P, enters the corner opener with a direction of movement indicated by the arrow in Fig. 17, and the double bend which is imparted to the corner of the pack is illustrated in Fig. 45, wherein P' indicates the major corner bend and P² what may be termed the minor corner bend, causing the extreme corner to stand upward at substantially right angles to the plane of the pack.

After the corner is bent in the manner illustrated in Fig. 45, the corner opener, and particularly the punch and die perform the important function of flexing the bent part, particularly the part P², bending it first in one direction and back to its former position so as to separate the corners of the sheets in the bent part P².

For this purpose, the punch 50ᵇ is not fixed to the slide 50, as is customary in presses, and the die 50ᶜ is not fixed to the frame, but the punch 50ᵇ is rotatably supported by the slide, on pins 50ᵈ (see Fig. 14) engaging in bearing brackets 50ᵉ of the slide 50. Likewise the die 50ᶜ is rotatably supported on the frame-work of the corner opener, one end being supported in a bearing 50ᶠ and the other end in a bracket 50ᵍ, both being shown in Fig. 14. It will be noted also by referring to this figure, that a portion of the die, i. e. that part located between the bearing 50ᶠ and the portion of the die utilized in bending the metal, is offset as shown at 50ʰ so as to clear the portions of the slide and punch immediately above it. Likewise the right hand portions of the slide and die are cut away so as to clear the portions of the die and bearing 50ᵍ beneath. This clearing of the stationary and movable parts of the die and punch is important for the reason that it is desired to make the center of rotation of the punch coincident with the center of rotation of the die, and that is the condition that prevails at the end of the bending stroke of the punch, the punch and die then being in the position shown in Fig. 52.

A further function that must be performed in order that the punch and die may be rotated so as to flex the upstanding corner portion P² of the pack is the clamping together of the die, punch and upstanding portion P² of the pack. To this end I pivot on the outer face of the die a clamping jaw 51 which is normally held away from the lower part of the die by a spring 51ᵃ, this jaw being pivoted to the die by a pin 51ᵇ shown in Figs. 14, 17 and 51, the left hand end of the pin projecting beyond the clamp as shown in Fig. 14, this projecting end of the pin entering into a U-shaped notch 51ᶜ (see Fig. 10) of an upstanding arm 51ᵈ, which is carried by and adapted to rotate with the die. When this pin carried by the punch enters the notch of the arm 51ᵈ, the two parts, i. e., the die and punch are constrained to rotate in unison when rotary motion is transmitted to one of them, and in this case the die. To cause the jaw to engage and pinch together the punch, die and bent portion P² of the pack, the jaw is provided with a forwardly projecting arm 51ᵉ carrying a roller 51ᶠ which engages a guide 52, (Figs. 17 to 22) having a straight guiding face 52ᵃ along which the roller rides during the down stroke of the punch, and having a curved guiding face 52ᵇ which the roller engages while the punch and die are being rotated, and the extreme corner of the pack is being flexed.

For the purpose of rotating these parts I provide on the shaft 48 a gear 53 which during the down stroke of the punch is loose on the shaft 48 and does not rotate, but after substantially a quarter revolution of the shaft 48, this gear is clutched to the shaft by a clutch member 53ᵃ (see Fig. 15) which is splined to the shaft and is moved into clutching engagement with a companion clutch member integral with or secured to gear 53, by a stationary pin 53ᵇ engaging a cam groove 53ᶜ of the clutch member 53ᵃ. The gear 53 engages a gear 53ᵈ which is keyed to the counter-shaft 49ᵈ, which, until the clutching action just referred to takes place, is not rotated, but as soon as the gear 53 is clutched to the shaft 48, the counter-shaft is rotated at twice the speed of the shaft 48. The countershaft 49ᵈ carries at one end a crank disk 49ᵉ which is connected at an off-center point by means of a connecting rod 49ᶠ to a crank arm 49ᵍ on one end of the rotatably supported die 50ᶜ,—the left hand end, as the same is viewed in Fig. 14.

The parts are so operated and timed that the slide and punch are lowered during about the first quarter revolution of the operating shaft 48, and when the lower edge of the punch forces the corner of the pack into the bottom of the recess of the die, the roller 50ᵃ rides onto a concentric portion of the cam 49ᶜ (see Fig. 17) extending for about 180° around the cam, and while the roller 50ᵃ is riding around this portion of the cam the slide remains stationary, but at about the time the roller engages this portion of the cam, the rotation of the punch and die begins, and as the direction of rotation is toward the guide 52, as soon as the parts begin to rotate, the action of the guide on the roller is to clamp the jaw against the die, pinching tightly the upstanding bent corner P² of the pack between the punch and die, the roller 51ᶠ having at the beginning of the rotation reached the curved portion of the guide.

As the crank disk 49ᵉ is rotated through a complete revolution, the punch and die with the corner P² of the pack are rotated or turned first in one direction and then back to normal position through a little less than a half revolution. In Fig. 18 I have shown the parts before the start of the turning movement and while the punch is descending and the jaw is still open. In Fig. 19 the jaw 51 is closed, and the turning movement is starting. In Fig. 20 the parts have been turned about half the full distance. In Fig. 21 the parts have reached the end of the turning movement away from normal position, and in Fig. 22 the parts are at the middle of the return movement toward normal position. On a further quarter revolution of the crank disk 49ᵉ, the rotary parts are again restored to normal position substantially shown in Fig. 18. In Fig. 44 I have shown the pack before the bending operation. In Fig. 45 the pack is shown after the corner has been bent as already described. In Figs. 46, 47, 48 and 49 I have shown how the upstanding corner portion P² is bent or flexed when the rotating parts are in the positions indicated in Figs. 19, 20, 21 and 22. In Fig. 50 I have shown the effect of this flexing the bent portion P² standing up as in Fig. 45, i. e., before the turning movement, but the corners of the individual sheets now being separated; and in Fig. 51 the same is shown in plan. In other words, after the corner has been given a double bend, already described, and when the extreme corner is bent first in one direction and then in the other, the corners of the sheets are separated substantially as shown in Fig. 50, so that the sheets can be subsequently grasped and stripped apart.

As shown in Fig. 52, I prefer to employ in conjunction with the punch 50ᵇ and die 50ᶜ, a yielding pad or plate 50ˣ inclined downward at its edges in conformity with the inclination of the lower face of the punch. This pad assists the punch in imparting the major bend P′, though its primary function is to lift the bent corner of the pack above the die when the jaw is released and the punch is elevated following the rotating movement. This will enable the pack to be automatically moved forward beyond the punch and die into the stripper or corner opener proper, which will now be explained.

As soon as the corner bending operation is completed as above described, the clutch of the corner bender is automatically thrown out and the clutch 22ᵏ is automatically thrown in, starting the edge trimmer and shear conveyors, and the pack is again moved forwardly, the front stop 40 having meanwhile been elevated out of the path of the pack. The pack is now moved by the conveyors 29 and 30 onto a conveyor 55 of the stripper unit including a frame designated generally by the reference character 54. This conveyor 55, which is directly in line with the previously described conveyors, and as clearly shown in Fig. 31, consists preferably of a series of chains or equivalent endless conveying devices 55ᵃ, traveling around rear sprockets 55ᵇ and front sprockets 55ᶜ, the front sprockets being on a driving shaft 55ᵈ connected by a chain and sprocket drive indicated at 55ᵉ to the front shaft of the lower conveyor 29.

The pack is moved forwardly on this conveyor until it engages a third stop or trip 56, (see Figs. 34 and 35,) this stop being located at the forward end of the conveyor 55 of the stripper unit. The movement of this stop 56 has a two-fold function, (first) of stopping the movement of all conveyors heretofore described, including the conveyor 55, and (second) of elevating a table 57 so as to lift the pack clear of the chains of the conveyor 55 and up against stripper rollers to be referred to. It will be observed by reference to Figs. 29 and 30 that the table 57 is provided with longitudinally extending grooves 57ᵃ through which travel chains 55ᵃ of the conveyor 55, these grooves permitting the table and pack to be elevated relative to the upper sections of the chains 55ᵃ as is clear from Fig. 30, which shows the table elevated.

Referring again to the stop 56, it will be observed that it is in the form of a lever pivoted at its lower end, and having connected to it a rod 56ᵃ (Fig. 35) which extends rearwardly from the stop alongside the conveyor 55 and table 57, as shown in Fig. 34, and at its rear end is connected to a bell-crank 56ᵇ which is pivoted between its ends as shown in Fig. 35. A foot or hand lever 56ᶜ in the form of a bell-crank, as shown in Fig. 35, has a pin and slot connection with the forward end of the rod 56ᵃ near the stop 56, so that the operator may, if he desires, stop the movement of the conveyors independently of the action of the pack on the stop 56.

The movement of the bell-crank 56ᵇ by the endwise movement of the rod 56ᵃ, whether the latter is actuated by the stop 56 or by the lever 56ᶜ, may be utilized in different ways to control the starting and stopping of the conveyors, but I prefer to have this control done electrically, and to that end I provide in the shaft 21 of the edge trimmer unit, in addition to the mechanical clutch 22ᵏ which, as described heretofore was utilized to start and stop the conveyors, a magnetic clutch 56ᵈ, indicated conventionally in Fig. 32. This clutch is normally energized, i. e., energized while the conveyors are being driven, and is de-energized by the opening of its circuit which normally connects it to a suitable source of current, not shown, through the actuation of a switch. This switch is indicated at 56ᵉ in Fig. 35, and in this instance is arranged beneath the lower end of a vertically movable plunger 56ᶠ, the upper end of the plunger being beneath one end of the bell-crank 56ᵇ to which the rod 56ᵃ is connected as aforesaid. Preferably when the rod 56ᵃ is restored to normal position, a spring or equivalent device immediately closes the switch 56ᵉ.

The other end of the bell-crank 56 is utilized to shift a clutch rod 56ᵍ to trip a clutch to elevate the table 57. To this end the following table elevating mechanism is provided: On the lower side of the table near its four corners, four arms 58 are provided, each arm having a roller 58ᵃ at its free end, and pivotally connected at its opposite end to the table. Between the arms and the under side of the table, springs 58ᵇ are provided to absorb any shock as the table is being elevated, and to yieldingly hold the table against the stripper rolls. The rollers 58ᵃ rest upon cams 59, which cams not only serve to elevate and lower the table, but support it as well, through the medium of the rollers 58ᵃ, arms 58 and springs 58ᵇ. These cams 59 are mounted on a pair of shafts 59ᵃ and 59ᵇ, these shafts being suitably supported in the frame 54 of the stripper unit, and the former being adjacent the rear end of the table, and the latter adjacent its forward end. By reference to Fig. 34 it will be observed that these two shafts are connected together by chain and sprocket gearing indicated generally by the reference character 59ᶜ, so that when one is revolved, the same movement is transmitted to the other, causing the two pairs of cams to be actuated in unison. For the purpose of actuating the shafts 59ᵃ and 59ᵇ to rotate the cams, the rear shaft 59ᵃ is provided with a gear 60, which gear, as will be seen by reference to Fig. 35ᵇ, is engaged by a gear 60ᵃ of one-half the diameter of gear 60. This gear 60ᵃ is mounted on a jack shaft 60ᵇ, clearly shown in Figs. 34 and 35ᵇ, this shaft extending laterally outward from the frame 54 of the stripper unit, and at its outer end being connected by bevel gearing 60ᶜ to the main drive shaft 27 (see particularly Fig. 31).

The gear 60ᵃ is bushed and normally loose on the jack shaft 60ᵇ, the latter having a pin type clutch of standard construction, and indicated at 60ᵈ in Fig. 35ᵃ, this clutch being tripped by the actuation of the clutch rod 56ᵍ of Fig. 35. In operation, when the clutch is thrown in, the jack shaft and gear 60ᵃ make one complete revolution, and then the gear 60ᵃ is unclutched from the jack shaft. The complete revolution of gear 60ᵃ rotates the relatively large gear 60 through a half revolution, this causing the cams to be turned from the position shown in Fig. 35ᵃ to the position shown in Fig. 28, and causing the table and the pack to be elevated. It is to be understood that the jack shaft 60ᵇ is constantly rotated by the shaft 27, and that each time the clutch is operated either to raise or lower the table, the cams 59 are given a half revolution. Suitable means will be provided to prevent overrunning of the shafts 59ᵃ and 59ᵇ carrying the cams 59, and in Fig. 35ᵇ I have shown the rear cam shaft 59ᵃ provided with a brake drum 60ᵉ.

When the table is elevated in the manner just explained, the pack is lifted against cylindrical stripping rolls 61 which are connected and actuated by endless chains, the table 57 and the conveyor 55 being arranged between the upper rearwardly traveling section and the lower forwardly traveling section of the endless series of stripping rolls. It will be observed particularly by reference to Figs. 1, 2 and 31, that the direction of travel, and therefore what may be termed the longitudinal axis of the group or series of stripper rolls is at an angle to the travel, and therefore axis of the conveyors of the edge trimmer and chassis units and the conveyor 55 of the stripper unit. Therefore, when the pack is pressed up against the lower sides of the upper rearwardly traveling rolls 61, the center line of the pack is inclined with respect to the rolls just above the pack and against which the pack is pressed. The purpose of this is to permit the successive sheets of the pack to be grasped at one corner and to be pulled or peeled from the pack progressively as the upper series of rolls travels rearwardly.

By reference particularly to Figs. 23, 25, 26 and 27 it will be observed that the stripper rolls 61 are carried by two endless chains designated generally by the reference character 62, which chains consist of links 62ᵃ and triangular shaped housings 62ᵇ in which the shafts 61ᵃ supporting the rolls 61 are journaled. These chains 62 carry rollers 62ᶜ (see particularly Figs. 25, 26 and 27) which travel in guide grooves 63 of portions of the stripper unit frame 54. Likewise these chains pass over sprockets 64 mounted on shafts 64ᵃ suitably supported in the frame 54 of the stripper unit, the front shaft 64ᵃ extending laterally from one side, and being connected to a driving motor, a portion of which is shown at 65 in Fig. 31, this motor being connected by suitable reducing gearing indicated generally by the reference character 65ᵃ and a clutch 65ᵇ to the shaft 64ᵃ.

The different sheets of the pack are designed to be pulled back over the successive rearwardly traveling stripping rolls in the manner indicated in Figs. 23 and 28, and inasmuch as there is a tendency for the sheets to cling together as already explained, the adhesion being severe in some instances, I associate with each stripper roll a knife or blade which is adapted to be vibrated so as to have a chopping action between the sheet being removed from the pack and the next adjacent sheet of the pack. The stripper blades which are associated with the stripper rolls are shown at 66, each consisting of a cutting or loosening blade 66$^a$ secured to a carrier 66$^b$, the ends of each of which are pivotally connected at 66$^c$ to the outer portions of the housings 62$^b$ in which the stripper rolls are journaled.

While the rolls are traveling rearwardly along the upper section of the course, the blades are pressed yieldingly inward by springs 67 (see particularly Figs. 26 and 27) which springs at their inner ends bear against the ends of the blade carrier, and at their outer ends bear against arms 67$^a$ pivoted at 66$^c$ to the outer portions of the housings 62$^b$. These arms 67$^a$ are connected to the housing 62$^b$ by links 67$^b$ each having a pin and slot connection with the associated housing so as to permit a certain oscillatory or vibratory movement of the blade. Likewise, these arms 67$^a$ are provided at their free ends with rollers 67$^c$ which are designed to roll along the under sides of rails 68 which are supported by the frame 54 of the stripper unit above the stripper rolls as they are traveling rearwardly along the upper course of their travel. The function of these rails is to compress the springs 67 so as to press the blades inwardly into the gap between the sheets being peeled off and the sheets beneath, and in order that the pressure of the springs may be varied, provision is made for adjusting the height of these rails. Any suitable means may be provided for this purpose, but in this instance at each end of the unit a pair of screw shafts 69 are provided in vertical position above the rails and journaled in housings 69$^a$ carried by the front and rear arch castings 54$^a$ and 54$^b$ mounted on the frame 54 of the stripper unit, these housings receiving for limited vertical movement the equivalent of nuts 69$^b$ attached to the rails beneath. I prefer that both ends of both rails be moved up or down uniformly, and therefore the screw shafts are shown connected by bevel gearing 69$^c$ to horizontal cross shafts 69$^d$ (see Fig. 25) which shafts are connected by chain and sprocket gearing indicated at 69$^e$ in Fig. 23, so that they will turn in unison when one of the shafts 69$^d$ is turned by any suitable means such as by a hand wheel 69$^f$ shown in Fig. 25.

For the purpose of vibrating the knives 66, I employ two traveling chains 70, which are parallel to the chains 62 carrying the stripper rolls 61, and are inside the stripper roll chains as will be seen by reference to Figs. 25, 27 and 31. These chains are provided with rollers 70$^a$ which are designed to engage cam-like lugs 66$^d$ (see Figs. 26 and 27) of the blade carriers 66$^b$ so as to lift the cutters, and then release the latter when the rollers ride past these lugs and permit the springs 67 to swing the cutters downward and inward so as to have the necessary cutting action. When this takes place the stripper rolls are traveling toward the left as the same are viewed in the several drawings and the vibrating chains are traveling to the right (see particularly Fig. 26). Obviously the rate of vibration of the stripper knives can be varied by varying the speed of the chains 70.

It is sometimes the case that the sheets can be stripped without the vibrating action of the cutters, and at other times it is necessary that the cutters be utilized in order that the sheets may be separated. I therefore provide means whereby the vibrating chains may be caused to travel at the same speed and in the same direction as the chains of the stripper rolls, in which event the knives will not be vibrated, and I provide additional means for causing them to travel in the opposite direction at any speed desired, in which event the knives are vibrated at the desired rate. This is accomplished by the arrangement and methods of drives now to be described. It will be observed that the vibrating chains 70 travel about sprockets 71 on the two shafts 64$^a$ which drive the chains of the stripper rolls. The sprockets are not fixed to these shafts, and the front sprockets 71 are on the hubs of gears 71$^a$, loose on the front shaft 64$^a$ of the stripping roll chains. These gears 71$^a$ are engaged by gears 71$^b$ fixed to a shaft 71$^c$ which is parallel to, and just rearward of the shaft 64$^a$ referred to, (see Fig. 31) this shaft being suitably supported in the frame 54 of the stripper unit. Two ways of driving this shaft 71$^c$ are provided, one by a variable speed motor 72, and the other by gearing from the shaft 64$^a$. The motor 72 is designed to be connected to the shaft 71$^c$ through worm and worm wheel reduction gearing or other suitable gearing contained in a case 72$^a$ and by an expanding ring clutch 72$^b$ by which the shaft may be clutched to the worm wheel of this gearing. The other method of drive is through a driving gear 73 on the front shaft 64$^a$, which gear drives a gear 73$^a$ on shaft 71$^c$, and adapted to be clutched by an expanding ring clutch 73$^b$ to the shaft 71$^c$. Between the clutches 73$^c$ and 72$^b$ there is a shifter 74, which when shifted in one direction, throws out clutch 72$^b$ and clutches gear 73$^a$ to shaft 71$^c$, in which event the chains are driven in the same direction and at the same speed, the ratio of the gears 73 and 73$^a$, and 71$^a$ and $71^b$, and of the sprockets 64 and 71 being such as to accomplish this result. On the other hand, when the shifter 74 is moved to its opposite position it unclutches gear $73^a$ from shaft $71^c$, and at the same time clutches the shaft to the worm wheel so that the shaft will be driven by the variable speed motor 72 by which the vibrating chains can be driven in the opposite direction from the stripper roll chains and at any speed desired.

I will next describe that important part of the stripper unit by which the corners of the sheets (where the corner of the pack was bent and the corners of the individual sheets separated in the corner opener) are grasped and the sheets are pulled or stripped from the pack around the rearwardly traveling stripper rolls. This is done by a series of traveling tongs 75 carried by a traveling chain 76, which chain is supported by a front driving sprocket 77, a front idler sprocket $77^a$, a pair of rear idler sprockets $77^b$ and $77^c$, and by a long guide 78 which extends from the front end of the stripper unit upwardly and rearwardly, and serving to hold the sheet gripping portions of the tongs in proper position with respect to the sheets as the sheets are stripped from the pack and are thus conveyed rearwardly and finally released so that they may be deposited on a platform or truck, indicated at 79 in Fig. 31, directly at the rear of the stripper unit or sheet opener proper.

Considering first the guide 78, it will be observed particularly by reference to Fig. 25, that this guide is composed of a pair of channels $78^a$ arranged back to back, and provided with inwardly extending angles $78^b$ forming a track for the rollers $76^b$ of the tong chains 76. The front end of the guide is supported in the front arch casting $54^a$ supported by the frame 54 of the stripper unit. The intermediate part of the guide is supported by the rear arch casting $54^b$ supported on the rear of the stripper frame (see Fig. 23) and the rear part of the guide is supported by suitable frame-work 80. The front arch casting $54^a$ likewise supports the driving and idler sprockets 77 and $77^a$, and the frame-work 80 supports the rear idler sprockets $77^b$ and $77^c$.

It will be noted that the front end of the guide 78 is given a substantially semi-circular curve, shown at $78^e$. Also rearwardly of the front arch casting the guide has a slight curvature for a purpose to be explained. Then the guide extends rearwardly in substantially a straight line, and at its end is inclined downwardly as shown at $78^d$.

The chain 76 consists of pairs of links $76^a$ which are spaced apart and carry on their pintles and on the outer sides of the links, rollers $76^b$ which travel along the angles $78^b$ of the guide 78 as previously explained.

The tongs 75 are pivotally connected to the chain 76 and project downwardly on the lower course of the chain and upwardly on the upper course, as clearly shown in Fig. 23. Each tong consists of two arms $75^a$ and $75^b$ which are pivoted between their ends at $75^c$. The free ends of the tongs, i. e., the ends remote from the chain, and indicated at $75^d$, constitute the jaws by which the corners of the sheets are grasped.

The tongs are connected to the tong chain at equally distributed points. Each set of tongs has one arm only pivotally connected to the chain, and in this instance it is the inner end of the arm designated $75^a$ which is pivoted or swiveled on one of the pintles at the center of the chain, the point of connection being indicated at $75^e$. The other arm is free of the chain except to the extent that at its inner end it is provided with a curved offset portion $75^f$ on the inner side of the chain, the end of the offset portion constituting a seat for a spring $75^g$, also located on the inner side of the chain and having one end bearing against the seat $75^f$, and its opposite end faced with a plate $75^h$ adapted to bear against the chain. The function of the curved offset portion $75^f$ and of the spring $75^g$ is to engage the chain and press the jaws $75^d$ together so that said jaws will have tight clamping engagement with the corner of the sheet, and to increase the clamping pressure as the load or pull on the tongs increases by the added weight of the sheet as it is gradually stripped from the pack as will be explained below.

In operation, when the pack is brought to a stop in the stripper unit, it is pressed up against the lower sides of the stripper rolls. The bent corner with the corners of the individual sheets loosened as already explained, now stands at the middle of the forward end of the stripper unit directly beneath the forward part of the tong chain, and therefore directly above the descending tongs where they travel downwardly and somewhat rearwardly about the forward idler sprockets 77 and $77^a$.

As the tongs travel about this part of the chain they hang freely, and the springs $75^g$ and curved offset portions $75^f$ now allow the jaws of the tongs to be opened. As the tongs reach the upstanding bent corner of the pack the operator standing at the forward end of the stripper unit will grasp the tongs and will cause the jaws to be placed over the upstanding corner of the uppermost sheet, and as the tongs become tilted the curved offset portion of arm $75^b$ engages and rides under the pintle carrying the adjacent rollers $76^b$ of the tong chain 76, causing the free ends or jaws to tightly clamp the corner of the sheet and locking them in tight clamping engagement therewith. As the tilting of the tongs is increased the spring 75$^g$ is pressed against the chain causing increased clamping pressure of the jaws on the sheet.

This the operator does with each of the tongs as they approach sheet grasping position so that the successive tongs are caused to grasp the successive sheets of the pack and to strip them from the pack, and they are gradually pulled back in the manner indicated in Figs. 23 and 28, an increasing length of each sheet being stripped from the pack as the associated stripper roller travels rearwardly.

It will be observed that as the tongs travel rearwardly and as the length of the stripped sheet increases, the tongs are swung more and more toward a position of parallelism with the chain, increasing the compression of the springs 75$^g$, and therefore causing increased clamping pressure of the jaws of the tongs on the sheets so as to compensate for increased drag due to the constantly increasing weight of the sheet which is supported by the tongs as the sheet is stripped off.

Finally when the entire sheet has been stripped from the pack, the tongs travel down the rear inclined part of the guide, and just before they reach the end of the guide they are straightened somewhat, or swung so as to release the sheet, whereupon it drops onto the support 79 previously referred to.

In Figs. 53 to 57 I have shown the preferred construction of the tongs and the preferred way in which they are supported on the tong chain. In the preceding views the tongs are shown somewhat conventionally.

By reference to Figs. 53 and 54 it will be readily seen that when the tongs hang vertically, as when the jaws are first placed about the upturned corner of the sheet, very little if any clamping pressure is exerted on the clamping jaws, but when the jaws are inclined, it is apparent that the offset portion 75$^f$ of arm 75$^b$ of the tongs engages the pintle of an adjacent pair of the rollers of the tong chain, and rides underneath the pintle, clamping the jaws tightly against the corner of the sheet, the clamping effect being increased by the action of the spring.

It will be seen in these figures also, that the upper end of the arm 75$^a$ where it is pivotally connected to the pintle of the chain has an elongated slot 75$^k$ through which the pintle of the chain passes. This slot is to enable the operator to slightly elevate the tongs in placing the jaws over the corner of the sheet. Preferably the arms of the tongs are provided with laterally projecting handles 75$^l$ to facilitate this movement.

In order that the tongs may be readily lifted and then inserted over the corner of the sheet, the extreme lower end of the jaw on arm 75$^a$ is preferably beveled, as shown at 75$^m$ in Fig. 57. By beveling the lower end of this jaw the operator has simply to elevate the tongs and then lower them, and the upturned corner of the sheet will slide between the jaws.

In Fig. 23 the two arms of the tongs are shown as pivoted together by a transverse pin. This method of pivoting may be employed if desired, but I prefer to pivot them as shown in Figs 53 to 56, which shows that jaw 75$^a$ passes through an opening or slot in arm 75$^b$, and that below this opening the jaws are connected together by a special bolt 75$^p$ which is screwed into one of the arms and has a spherically curved head 75$^r$ fitting into a similarly shaped socket of the other arm, and passing loosely through this arm.

A coil spring 75$^s$ located in recesses on the adjacent faces of the two arms keeps the head of the bolt in a close engagement with the recess or socket of the arm 75$^b$. There is sufficient play between the shank of the bolt and the opening of the arm 75$^b$ through which the bolt passes to allow the slight motion necessary to open and close the jaws. The advantage of connecting the arms of the tongs by bolt 75$^p$ having the spherical head 75$^r$ is that it allows a sort of universal action which enables the jaws at the lower ends of the tongs to grasp a corner of the sheet for the full width of the jaws and to hold the same with uniform pressure for the full width.

It might be here stated that the pack is pressed up against the stripper rolls in a diagonal position with respect to the direction of travel of the rolls, as has already been made clear. In consequence, as the tongs grasp the sheets at the corner of the pack, the sheets are pulled around the stripper rolls diagonally with respect to the length or side edges of the pack. This is a very important feature of the invention, for when the sheets are stripped in this diagonal fashion they are separated from the pack much more readily than if the direction of the pull were parallel to the length of the pack.

If the sheets do not adhere tightly together and are readily stripped apart, the vibrating knives need not be utilized, in which event the vibrating chains travel with, or at the same speed of the stripper roll chains. On the other hand, if the sheets adhere more or less tightly together, the vibrating knives will be utilized to loosen or separate the sheets as they are stripped off, in which event the vibrating chains will be caused to travel in an opposite direction from the travel of the stripper roll chains, and at a speed dependent upon the desired rate of vibration of the stripper knives.

It is, of course, important that the horizontal travel of the stripper rolls and the travel of the tongs up the inclined portion of the guideway be properly co-ordinated so that the tongs will travel at just the right speed as the sheets are pulled over the top portions of the stripper rolls.

Inasmuch as at the start of the stripping operation the sheets extend about a relatively small portion of the periphery of the rolls, and as they travel rearwardly they extend about an increasingly greater portion of the periphery of the rolls, it is deemed advisable to compensate for this by slightly curving the guide for some distance beyond the front arch casting 54ª, otherwise the pull of a sheet on the tongs might be so severe as to pull the corners of the sheets from the tongs.

The tong chain may be driven in different ways, but preferably by the front shaft 64ª which drives the stripper roll chains. Therefore, in this instance the front stripper roll shaft 64ª is provided at one side of the stripper unit (see Fig. 31) with a sprocket 81 adapted to drive through a suitable sprocket chain, a shaft 82 on which the driving sprockets 77 of the tong chain are secured, this shaft being extended laterally, and being provided at its outer end with a sprocket 83 which is adapted to be connected to a driving sprocket 84 on the stripper roll driving shaft 64ª beneath.

In operation, the edge trimmers 17 and 18 are adjusted so that the pack will be cut to the right width and the corner opener will be adjusted to a position such that the pack will be cut to the right length. Then when the motor driving shaft 27 is started, the conveyors of the edge trimmer, the conveyors of the shear and corner opener, and the conveyor 55 of the stripper will all be set in motion. The pack to be operated on is then placed on the conveyor 1, whereupon it is started through the machine. As it passes through the edge trimmmer, both edges will be cut, and when the forward end of the pack reaches the first stop 26, said conveyors are stopped, and the shear blade is lowered, trimming off the forward end of the pack. Thereupon the conveyors are again started, and the pack is moved forwardly. When the forward end of the pack reaches the stop 40, movement of the conveyors is again stopped, the rear end of the pack is sheared off, and at or about the same time the corner opener it set into operation and the corner of the pack is opened as described. On the completion of these operations the pack is again carried forwardly by the conveyors until the forward end of the pack engages and shifts the stop 56, whereupon the conveyors are again stopped, and the pack is automatically elevated or lifted by the table 57 against the upper stripper rollers. The operator standing at the forward end of the machine will cause the tongs 75, one at a time to grasp the sheets at the opened corner of the pack, and to strip the sheets from the pack by pulling them around the rearwardly traveling stripper rolls, and will then drop them in open condition onto the platform or truck 79. When the sheets of the pack have thus been separated, the operation above described is repeated for the next pack.

While I have shown one form of the apparatus only, it will be obvious that many of the parts may be differently constructed or arranged, and I therefore do not desire to be confined to the exact details shown, but aim in my claims to cover all modifications which do not involve a departure from the spirit and scope of the invention as set forth in the appended claims.

Having described my invention, I claim:

1. In a sheet opener, means for grasping and flexing one corner of a pack of rolled sheets so as to separate the sheets at the corner, means for holding the pack during the operation of said flexing means and means for operating said flexing means.

2. In a sheet opener, means for holding a pack of sheets, in combination with means for mechanically flexing one portion of the pack to separate the sheets at said portion, and means for operating said holding and flexing means.

3. In combination with a conveyor for a pack of sheets a corner opener comprising a device having elements for grasping and flexing one corner of the pack to separate the sheets at the corner, and means for operating said corner opener.

4. In a sheet opener, means for separating the sheets at one portion of a pack, said means including devices for bending said portion of the pack and subsequently flexing the bent portion.

5. In a sheet opener, means for separating the sheets at one portion of a pack, comprising devices for bending said portion of the pack, and means for rotating said devices to flex the bent portion.

6. In a sheet opener, means for separating the sheets at one portion of the pack, including a die and a punch for bending said portion, and means for moving the die and punch together to bring about the flexing of the bent portion.

7. In a sheet opener, means for separating the sheets at one portion of the pack, including a die and a punch for bending said portion, both the die and the punch being rotatably mounted.

8. In a sheet opener, means for separating the sheets at one portion of the pack comprising a die and a reciprocating punch for bending said portion, said die and punch being rotatable about a common axis.

9. In a sheet opener, means for separating the sheets at one corner of a pack, comprising a die and punch, means for reciprocating the punch so as to bring the punch to the die with the corner of the pack between them, and means for rotating the die and punch while they are engaging the corner of the pack.

10. In a sheet opener, means for separating the sheets at one portion of the pack, said means including a die and punch, means for reciprocating the punch so as to cause it to bend said portion of the pack in the die, means for clamping the die and punch and said portion of the pack together, and means for rotating these parts while they are in engagement.

11. In a sheet opener, means for separating the sheets at one corner of a pack comprising a die and a punch, means for moving the punch toward the die so as to bend one corner of the pack between the two, means for rotating the die and punch about a common axis so as to flex the bent corner of the pack, the parts being rotated away from and then back to normal position, and means for subsequently moving the punch.

12. In a sheet opener, the combination of cutting means for cutting off the edges of the pack, an opener for separating the sheets at one portion of the pack, and means for supporting the pack and causing the same to be acted upon by the cutting means and opener.

13. In a sheet opener, the combination of means for cutting off the ends of the pack, an opener for opening the sheets at one portion of the pack, and means for causing the pack to be successively acted upon by the cutting means and opener.

14. In a sheet opener, the combination of means for trimming the edges and cutting off the ends of the pack so as to cut the pack to the right dimensions, a sheet opening device and means for moving the pack from the trimming and cutting means to the sheet opener.

15. In a sheet opener, the combination of means for trimming the edges and cutting off the ends of the pack so as to cut the pack to the right dimensions, an opener for opening the sheets at one portion of the pack, and means for causing the pack to be successively acted upon by the cutting means and opener.

16. In a sheet opener, the combination of conveying means, pack cutting means with respect to which the pack is conveyed by the conveying means, and an opener to which the pack is fed by the conveyor for opening the sheets at one corner of the pack.

17. In a sheet opener, the combination of conveying means, edge trimming and end cutting means for the pack, along which the pack is successively conveyed by the conveying means, and an opener to which the pack is fed by the conveying means for separating the sheets at one portion of the pack.

18. In a sheet opener, pack conveying means, cutting means, and stops for stopping the conveying means when the forward end of the pack has reached a predetermined position with respect to the cutting means, and a sheet opener to which the conveying means feeds the pack.

19. In a sheet opener, pack conveying means, cutting means, stops for stopping the conveying means when the forward end of the pack has reached a predetermined position with respect to the cutting means, and an opener to which the conveying means feeds the pack for separating the sheets at one portion of the pack.

20. In a sheet opener, pack conveying means, cutting means, stops for stopping the conveying means when the forward end of the pack has reached a predetermined position with respect to the cutting means, and an opener located in advance of the cutting means and to which the conveying means feeds the pack for opening the sheets at one portion of the pack.

21. In a sheet opener, means for holding a pack, and means associated therewith for separately grasping and simultaneously stripping a plurality of the sheets from the pack.

22. In a sheet opener, means for holding a pack, and traveling means having a plurality of devices which successively grasp and pull the individual sheets from the pack.

23. In a sheet opener, a plurality of stripper rolls, means for pressing a pack against the stripper rolls, and means associated therewith for grasping and pulling the sheets from the pack one at a time.

24. In a sheet opener, a plurality of traveling stripper rolls, means for pressing a pack of sheets against the stripper rolls, and means for grasping and pulling the individual sheets of the pack over and around the traveling stripper rolls.

25. In a sheet opener, a traveling stripper roll against which a pack of sheets is adapted to be pressed, and means adapted to be moved in the direction of travel of the stripper roll for pulling a sheet off the pack around the stripper roll.

26. In a sheet opener, mechanical means for grasping the corners of a plurality of sheets of a pack, and for simultaneously stripping the sheets from the pack in a direction diagonal with respect to the length of the pack.

27. In a sheet opener, means for stripping the sheets from a pack, comprising a traveling roll which moves over the pack in a direction at an angle to the edges of the pack, in combination with means for grasping a sheet and pulling the same over the roll.

28. In a sheet opener, a plurality of traveling rolls against which a pack is adapted to be held with the rolls traveling in a direction inclined with respect to the edges of the pack, in combination with means for grasping the different sheets of the pack at the corner of the latter, and pulling the same one at a time around the traveling rolls.

29. In a sheet opener, a stripper roll adapted to travel over a pack of sheets to be separated, means for grasping the sheets at one end of the pack and for pulling the same around the roll, and means adapted to be inserted between the pack and the sheet being stripped therefrom for loosening the sheet while being pulled around the roll.

30. In a sheet opener, a plurality of traveling stripper rolls against which a pack is adapted to be held, means for grasping the sheets one at a time at one end of the pack and for pulling them individually about the different rolls, and a plurality of separator knives movable with the rolls, and means for causing them to be inserted between the pack and the sheets being separated therefrom.

31. In a sheet opener, a plurality of stripper rolls against which a pack is adapted to be held, means for grasping the sheets at one end of the pack and for pulling them one at a time about successive rolls, and an endless traveling member carrying said means.

32. In a sheet opener, a plurality of stripper rolls against which a pack is adapted to be held, means for grasping the sheets at one end of the pack and for pulling them one at a time about successive rolls, an endless traveling member carrying said means, said traveling member moving at twice the speed of the traveling rolls.

33. In a sheet opener, a plurality of stripper rolls against which a pack is adapted to be held, means for grasping the sheets at one end of the pack and pulling them one at a time about successive rolls, an endless traveling member carrying said means, and a curved race through which said endless member travels, said race being shaped to compensate for the varying points at which the different sheets leave the periphery of the rolls.

34. In a machine for separating the sheets of a pack, means for separably grasping and stripping the sheets from the pack, comprising a traveling endless member and a plurality of sheet grasping tongs supported thereby.

35. In a machine for separating the sheets of a pack, means for separably grasping and stripping the sheets from the pack, comprising a traveling endless member and a plurality of sheet grasping tongs supported thereby, said tongs having sheet grasping jaws at their free ends and means associated with the tongs for causing the jaws to be tightly clamped against the sheet when the tongs are inclined.

36. In a sheet opener, a plurality of traveling stripper rolls, and an elevating table for elevating a pack of sheets against the rolls.

37. In a sheet opener, a plurality of traveling stripper rolls, and an elevating table for elevating a pack of sheets against the rolls, in combination with means for pulling the sheets of a pack around the rolls.

38. In a sheet opener, a plurality of stripper rolls arranged in the form of an endless chain, means at the ends of the rolls for supporting and connecting them together, and separating knives carried by said means.

39. In a sheet opener, a plurality of traveling stripper rolls connected together, vibrating knives carried by the stripper rolls for separating the sheets from the pack, and means for vibrating the knives.

40. In a sheet opener for stripping the sheets from a pack, means for successively grasping the sheets at one end of the pack and for simultaneously stripping a plurality of sheets therefrom.

41. In a sheet opener for stripping sheets from a pack, a traveling device for successively grasping the sheets at one end of the pack and pulling them therefrom whereby a plurality of sheets are separated from the pack at the same time.

42. In a sheet opener, a plurality of traveling stripper rolls connected together in the form of an endless chain, vibratory knives carried by the chain, and means for causing the knives to vibrate at varying speeds.

43. In a sheet opener, a plurality of stripper rolls connected together in the form of an endless chain, separating knives carried by the chain, and means whereby the knives may be moved along with the rolls without vibration or with a vibratory motion.

44. In a sheet opener, a plurality of traveling stripper rolls connected together, means for elevating the pack against the rolls, vibratory knives for separating the sheets from the pack, in combination with means for grasping the sheets at one end of the pack and pulling them around the rolls.

45. In a sheet opener, the combination of means for opening the sheets at one edge of the pack, and means for simultaneously separating a plurality of the sheets from the pack.

46. In a sheet opener, the combination with means for opening a plurality of sheets at one end of the pack, of a plurality of strippers for grasping individual sheets at the open end of the pack and simultaneously separating them.

47. In a sheet opener, an opener for separating the sheets at one edge of the pack, means for simultaneously separating the sheets so opened at the edge of the pack, and means for advancing the sheets from the opener to the separating means.

48. In a sheet opener, an opener for separating the sheets at one end of the pack, a stripper comprising a traveling stripper roll, and means for grasping a sheet and pulling the same from the pack around the roll.

49. In a sheet opener, means for opening the sheets at one end of a pack, a stripper comprising a plurality of traveling stripper rolls, means for pressing the pack against the stripper rolls, and traveling means for grasping the sheets at the opened part of the pack and separately pulling them over and around the traveling stripper rolls.

50. In a sheet opener, means for manipulating the pack, cutting means for cutting a pack of sheets to size, an opener for separating the sheets at one end of the pack, a stripper for stripping the sheets from the pack, and actuating means for the cutting means, opener, stripper and manipulating means whereby said operations are successively performed.

51. In a sheet opener, cutting means for cutting a pack of sheets to size, an opener for separating the sheets at one end of the pack, a stripper for stripping the sheets from the pack, and pack conveying means associated with said cutting means, opener and stripping means for feeding the pack successively to the cutter, opener and stripper.

52. In a sheet opener, a plurality of units comprising a pack cutting unit for cutting a pack to size, a corner opening unit for separating the sheets at one corner of the pack, and a stripper unit for stripping the sheets apart, in combination with means for feeding a pack successively to the different units, and means for operating the feeding means, cutter, opener and stripper in timed relation.

53. In a sheet opener, an edge trimming unit, an end cutting unit, an opening unit for separating the sheets at one end of the pack, and a stripper unit for separating the sheets, means for actuating the mechanisms of the various units and means for feeding the pack successively to the various units.

54. In a sheet opener, an edge trimming unit, an end cutting unit, an opening unit for separating the sheets at one end of the pack, a stripper unit for separating the sheets, and conveying means for successively conveying the pack from one unit to the next adjacent unit and for supporting the pack during the successive operations.

55. In a sheet opener, an edge trimming unit, an end cutting unit, an opening unit for separating the sheets at one end of the pack, a stripper unit for separating the sheets, conveying means for successively conveying the pack from one unit and for supporting the pack during the successive operations to the next adjacent unit, and means for stopping the conveying means during the operation of certain of the units.

56. In a sheet opener, an edge trimming unit, an end cutting unit, an opening unit for separating the sheets at one end of the pack, a stripper unit for separating the sheets, conveying means for successively conveying the pack from one unit to the next adjacent unit, and means for stopping the conveying means so as to stop the movement of the pack in the end cutting and corner opening units.

57. In a sheet opener, a pack feeding means, cutting means for cutting a pack of sheets to size while on the feeding means, including means for cutting off the ends of the pack, an opener in advance of said pack cutting means for bending one portion of the pack and flexing the bent portion to separate the sheets at said portion, and means for adjusting the position of said opener to adapt the apparatus for packs of different lengths.

58. In a sheet opener, cutting means for cutting off the ends of a pack, an opener having means for grasping and bending one portion of the pack and flexing the bent portion to separate the sheets at said portion, conveying means for the pack, and means for automatically stopping the conveying means when the pack reaches predetermined positions with respect to the cutting means and corner opener.

59. In a sheet opener, a pack conveying means, an opener for flexing the pack carried by the conveying means at one end so as to separate the sheets, in combination with means for automatically operating the opener when the pack reaches a predetermined position with respect thereto.

60. In a sheet opener, cutting means for cutting a pack to size, including means for cutting off the ends of the pack, an opener for flexing one portion of the pack so as to open the sheets at said portion, conveying means for the pack, and means controlled by the movement of the pack for causing the operation of said end cutting means and of the opener when the pack reaches predetermined positions.

61. In a sheet opener, cutting means for cutting a pack to size including means for cutting off the ends of the pack, an opener for flexing one portion of the pack so as to open the sheets at said portion, conveying means for the pack, and means controlled by the movement of the pack for stopping the travel of the pack and for causing the operation of the end cutting means and opener when the pack reaches predetermined positions.

62. In a sheet opener, cutting means for cutting a pack to size, including means for cutting off the end of the pack, an opener for opening the sheets at one portion of the pack, a stripper for separating the sheets, conveying means for conveying the pack successively to the cutting means, the opener and stripper, and means controlled by the movement of the pack for stopping the travel of the pack when it reaches predetermined positions.

63. In a sheet opener, pack cutting means including means for cutting off the ends of the pack to cut it to size, a corner opener for opening the sheets at one corner of the pack, a stripper for separating the sheets, conveying means for conveying the pack first to the cutting means, then to the corner opener, and then to the stripper, and means for automatically causing the stopping of the travel of the pack when the latter reaches predetermined positions, and for causing the operation of the end cutting means and of the corner opener.

64. In a sheet opener, cutting means for cutting a pack to size, including end cutting means, a corner opener for separating the sheets at one corner of the pack, a stripper for separating the sheets from the pack, pack elevating means at the stripper, pack conveying means for conveying the pack to the cutting means, corner opener and stripper, and means automatically operated when the pack reaches predetermined positions for causing the operation of the end cutting means, corner opener and of the elevating means at the stripper.

65. In a sheet opener, cutting means for cutting a pack to size, including end cutting means, a corner opener for separating the sheets at one corner of the pack, a stripper for separating the sheets from the pack, pack elevating means at the stripper, pack conveying means for conveying the pack to the cutting means, corner opener and stripper, and means for automatically stopping the travel of the pack when it reaches predetermined positions, and for causing the operation of the end cutting means, corner opener and elevating means of the stripper.

66. In a sheet opener, a sheet separating device including a plurality of knives each adapted to engage between a different pair of superposed sheets of the pack, and means for causing said knives to traverse the pack to separate a plurality of sheets.

67. In a sheet opener, a sheet opening device including a plurality of knives adapted to be inserted beneath successive sheets of the pack at one end of the pack and means for causing said knives to traverse the pack from end to end to separate a plurality of sheets.

68. In a sheet opener, a sheet opening device including a series of knives adapted to be inserted one beneath each of the superposed sheets of the pack and means for causing said knives to traverse the pack to separate the sheets.

69. In a sheet opener, means for opening the sheets of the pack at one edge portion thereof, a sheet separating means comprising a plurality of knives adapted to engage between different pairs of superposed sheets of the pack, and means for feeding the pack from the opening means to the knives and for causing the knives to be moved through the pack.

In testimony whereof, I hereunto affix my signature.

EDWARD G. LEHMAN.